US008578487B2

(12) United States Patent
Soeder

(10) Patent No.: US 8,578,487 B2
(45) Date of Patent: Nov. 5, 2013

(54) SYSTEM AND METHOD FOR INTERNET SECURITY

(75) Inventor: Derek A. Soeder, Sulphur Springs, TX (US)

(73) Assignee: Cylance Inc., Irvine, CA (US)

( * ) Notice: Subject to any disclaimer, the term of this patent is extended or adjusted under 35 U.S.C. 154(b) by 317 days.

(21) Appl. No.: 12/939,766

(22) Filed: Nov. 4, 2010

(65) Prior Publication Data

US 2012/0117644 A1    May 10, 2012

(51) Int. Cl.
*H04L 29/06* (2006.01)
(52) U.S. Cl.
USPC ................................................ 726/22; 726/1
(58) Field of Classification Search
USPC ....................................................... 726/22, 1
See application file for complete search history.

(56) References Cited

U.S. PATENT DOCUMENTS

| | | | |
|---|---|---|---|
| 6,026,237 A | 2/2000 | Berry et al. | |
| 6,260,187 B1 | 7/2001 | Cirne | |
| 6,968,540 B2 | 11/2005 | Beck et al. | |
| 6,970,924 B1 * | 11/2005 | Chu et al. | 709/224 |
| 7,197,745 B2 * | 3/2007 | Ray et al. | 717/127 |
| 7,281,242 B2 | 10/2007 | Inamdar | |
| 7,313,822 B2 | 12/2007 | Ben-Itzhak | |
| 7,366,777 B2 * | 4/2008 | Hill et al. | 709/226 |
| 7,367,025 B1 | 4/2008 | Nikolov et al. | |
| 7,426,723 B1 | 9/2008 | Nikolov | |
| 7,437,362 B1 | 10/2008 | Ben-Natan | |
| 7,444,331 B1 * | 10/2008 | Nachenberg et al. | 1/1 |
| 7,458,072 B2 | 11/2008 | Moorthy et al. | |
| 7,484,209 B2 | 1/2009 | Avakian et al. | |
| 7,487,149 B2 * | 2/2009 | Wong | 1/1 |
| 7,493,622 B2 | 2/2009 | Borkan | |
| 7,500,227 B1 | 3/2009 | Fontana et al. | |
| 7,536,680 B2 | 5/2009 | Berry et al. | |
| 7,558,796 B1 * | 7/2009 | Bromwich et al. | 1/1 |
| 7,689,558 B2 | 3/2010 | Rossmann | |
| 7,725,882 B1 | 5/2010 | Spertus et al. | |
| 7,730,544 B2 * | 6/2010 | Volp | 726/27 |
| 7,805,717 B1 | 9/2010 | Spertus et al. | |
| 7,823,137 B2 | 10/2010 | Chagoly et al. | |

(Continued)

OTHER PUBLICATIONS

Absil, Microsoft Research, "AbsIL SDK for .net Framework." [online] Sep. 20, 2006, <http://research.microsoft.com/en-us/downloads/6a34a558-ab57-424f-a799-f0fc458105c1/default.aspx>, retrieved Oct. 25, 2011, 1 page.

(Continued)

*Primary Examiner* — David Garcia Cervetti
(74) *Attorney, Agent, or Firm* — Mintz Levin Cohn Ferris Glovsky and Popeo, P.C.

(57) ABSTRACT

A computer implemented method for preventing SQL injection attacks comprises intercepting a web request associated with a web service at a first software hook in a first web service execution context, persisting at least a portion of the intercepted web request in a storage location associated with the first software hook and accessible to at least one additional execution context, intercepting a database query generated by at least one web service processing operation at a second software hook associated with the execution of the query, wherein the query is generated in response to the intercepted web request and the second hook retrieves the persisted portion of the intercepted web request, comparing a portion of the persisted portion of the intercepted web request with at least a portion of the intercepted database query, and determining, prior to the query being executed, whether the query corresponds to a potential SQL injection attack.

23 Claims, 9 Drawing Sheets

(56) References Cited

U.S. PATENT DOCUMENTS

| | | | |
|---|---|---|---|
| 8,010,522 B2* | 8/2011 | Dewey et al. | 707/714 |
| 8,087,031 B2* | 12/2011 | Violleau et al. | 719/315 |
| 8,166,114 B2* | 4/2012 | Alstad | 709/206 |
| 8,213,393 B2* | 7/2012 | Suganthi et al. | 370/338 |
| 8,225,402 B1* | 7/2012 | Averbuch et al. | 726/23 |
| 2002/0157020 A1 | 10/2002 | Royer | |
| 2003/0131049 A1* | 7/2003 | Banerjee et al. | 709/203 |
| 2003/0204719 A1 | 10/2003 | Ben-Itzhak | |
| 2004/0226459 A1* | 11/2004 | Hill et al. | 100/116 |
| 2005/0091659 A1* | 4/2005 | Susser et al. | 718/108 |
| 2005/0198099 A1 | 9/2005 | Motsinger et al. | |
| 2005/0203921 A1 | 9/2005 | Newman et al. | |
| 2006/0143688 A1 | 6/2006 | Futoransky et al. | |
| 2006/0212438 A1* | 9/2006 | Ng | 707/4 |
| 2006/0242136 A1* | 10/2006 | Hammond et al. | 707/4 |
| 2007/0011742 A1 | 1/2007 | Nakayama et al. | |
| 2007/0016685 A1 | 1/2007 | Crume | |
| 2007/0074169 A1* | 3/2007 | Chess et al. | 717/126 |
| 2007/0136312 A1* | 6/2007 | Shulman et al. | 707/10 |
| 2007/0136802 A1 | 6/2007 | Matoba | |
| 2007/0136809 A1* | 6/2007 | Kim et al. | 726/22 |
| 2007/0156644 A1* | 7/2007 | Johnson et al. | 707/2 |
| 2007/0271375 A1 | 11/2007 | Hwang | |
| 2008/0034424 A1 | 2/2008 | Overcash et al. | |
| 2008/0034425 A1 | 2/2008 | Overcash et al. | |
| 2008/0047009 A1 | 2/2008 | Overcash et al. | |
| 2008/0275843 A1* | 11/2008 | Lal et al. | 707/3 |
| 2009/0037763 A1* | 2/2009 | Adhya et al. | 714/4 |
| 2009/0049547 A1* | 2/2009 | Fan | 726/22 |
| 2009/0055802 A1 | 2/2009 | Crosby | |
| 2009/0077573 A1 | 3/2009 | Moorthy et al. | |
| 2009/0100518 A1 | 4/2009 | Overcash | |
| 2009/0112885 A1 | 4/2009 | Markovich | |
| 2009/0112981 A1 | 4/2009 | Markovich | |
| 2009/0113111 A1* | 4/2009 | Chen et al. | 711/6 |
| 2009/0113424 A1* | 4/2009 | Chen et al. | 718/1 |
| 2009/0113425 A1* | 4/2009 | Ports et al. | 718/1 |
| 2009/0138848 A1 | 5/2009 | Okubo | |
| 2009/0150374 A1* | 6/2009 | Dewey et al. | 707/5 |
| 2009/0172638 A1 | 7/2009 | Cobb | |
| 2009/0205047 A1 | 8/2009 | Podjarny | |
| 2009/0307466 A1* | 12/2009 | Barsness et al. | 712/220 |
| 2010/0023951 A1* | 1/2010 | Violleau et al. | 719/315 |
| 2010/0138817 A1 | 6/2010 | Dubinsky et al. | |
| 2011/0252475 A1* | 10/2011 | Mui et al. | 726/23 |

OTHER PUBLICATIONS

Dahm, Markus, "*Apache Commons*," Byte Code Engineering Library (BCEL), 2004, [online], http://jakarta.apache.org/bcel/, retrieved Oct. 25, 2011, 1 page.
Lee, Han Bok, et al., "*BIT: A Tool for Instrumenting Java Bytecodes*," Dec. 1997, [online], <http://research.microsoft.com/en-us/um/people/zorn/pubs/usits97-bit.pdf>, retrieved Oct. 24, 2011, 10 pages.
Mikunov, Alex, "*The Implementation of Model Constraints* in .net—II," Aug. 24, 2003, [online], <http://www.codeproject.com/KB/dotnet/model_constraints_in_net2.aspx>, retrieved Sep. 12, 2011, 6 pages.
Elmalki, Ziad, "*CLR Injection: Runtime Method Replacer*," Jun. 23, 2009, [online], <http://www.codeproject.com/KB/dotnet/CLRMethodInjection.aspx>, retrieved Jun. 6, 2011, 6 pages.
U.S. Appl. No. 13/118,238, filed May 27, 2011, Soeder.
Brubacher, Doug, and Galen Hunt, "Detours," 1999, [online], <http://research.microsoft.com/en-us/projects/detours/>, retrieved Jun. 6, 2011, 2 pages.
Conover, Matthew "*NET*," May 2002, [online], <http://dotnethook.sourceforge.net/>, retrieved Oct. 24, 2011, 4 pages.
Larus, James, "*EEL: An Executable Editing Library*," Jun. 1, 1996, [online], <http://pages.cs.wisc.edu/~larus/eel.html>, retrieved Oct. 25, 2011, 2 pages.
Romer, Ted, et al., "*Instrumentation and Optimization of WIN32/Intel Executables*," 1997, [online], <http://etch.cs.washington.edu/>, retrieved Oct. 25, 2011, 1 page.

"*ICorProfilerInfo::GetCodeInfo Method*," Microsoft Corp., [online], <http://msdn.microsoft.com/en-us/library/ms231909.aspx, retrieved Oct. 25, 2011, 2 pages.
Morrison, Vance, "*To Inline or not to Inline: That is the question*," Aug. 19, 2008, [online], <http://blogs.msdn.com/b/vancem/archive/2008/08/19/to-inline-or-not-to-inline-that-is-the-question.aspx>, retrieved Jun. 10, 2011, 5 pages.
Broman, David, *Instrumentation of internalcall methods*, 2007, [online], <http://social.msdn.microsoft.com/Forums/en-US/netfxtoolsdev/thread/6e8fb5f6-a846-492e-ad61-fb1ae05a60c8/>, retrieved Jun. 10, 20111, 3 pages.
Laffra, Chris, et al.. "Jikes Bytecode Toolkit," Mar. 31, 2000, [online], <http://www.alphaworks.ibm.com/tech/jikesbt/>, retrieved Jun. 10, 201, 2 pages.
Cohen, Geoff, and Jeff Chase, "The Java Object Instrumentation Environment," May 1, 2003, [online], <http://www.cs.duke.edu/ari/joie/>, retrieved Jun. 10, 2011, 2 pages.
"*Java Virtual Machine Debug Interface Reference*," Sun Microsystems, Inc., 1999, [online], <http://download.oracle.com/javase/1.3/docs/guide/jpda/jvmdi-spec.html>, retrieved Jun. 10, 2011, 49 pages.
"*Java Virtual Machine Profiler Interface (JVMPI)*", Sun Microsystems, Inc., 1999, [online], <http://download.oracle.com/javase/1.3/docs/guide/jvmpi/jvmpi.html>, retrieved Jun. 10, 2011, 33 pages.
"*JVM Tool Interface*," Sun Microsystems, Inc., 2002, [online], retrieved Oct. 25, 2011 <http://download.oracle.com/javase/1.5.0/docs/guide/jvmti/jvmti.html>, 198 pages.
Kumar, S. Senthil, "*MethodLogger—Hook into method calls* in .net binaries," Nov. 20, 2006, [online], retrieved <http://www.codeproject.com/KB/dotnet/methodlogger.aspx>, retrieved Jun. 10, 2011, 5 pages.
Richter, Jeffrey, "*Garbage Collectionâ: Automatic Memory Management in the Microsoft .net Framework*" MSDN Magazine, Nov. 2000, [online], , <http://msdn.microsoft.com/en-us/magazine/bb985010.aspx>, retrieved Jun. 10, 2011, 8 pages.
Richter, Jeffrey, "Garbage Collection, Automatic Memory Management in the Microsoft .net Framework," *MSDN Magazine*, Nov. 2000, [online], <URL: http://msdn.microsoft.com/en-us/magazine/bb985010.aspx>, retrieved Jul. 13, 2011, 8 pages.
Keserovic, Sonja, et al., "An Overview of Managed/Unmanaged Code Interoperability," Oct. 2003, [online], <http://msdn.microsoft.com/en-us/library/ms973872.aspx>, retrieved Jun. 10, 2011, 11 pages.
Kommalapati, Hanu, and Tom Christian, "*JIT and Run: Drill Into* .net *Framework Internals to See How the CLR Creates Runtime Objects*," May 2005, [online], <http://msdn.microsoft.com/en-us/magazine/cc163791.aspx>, retrieved Jun. 10, 2011, 16 pages.
Mikunov, Aleksandr, ".net Internals: Rewrite MSIL Code on the Fly with the .net Framework Profiling API" *MSDN Magazine*, Sep. 2003, [online], <http://msdn.microsoft.com/en-us/magazine/cc188743(printer).aspx>,, retrieved Jun. 10, 2011, 18 pages.
Elmalki, Ziad, "*MSIL Injection: Rewrite a non dynamic method at runtime*," [online], Mar. 29, 2009, <http://blogs.msdn.com/b/zelmalki/archive/2009/03/29/msil-injection-rewrite-a-non-dynamic-method-at-runtime.aspx>, retrieved Jun. 10, 2011, 6 pages.
Mutel, Alexandre, ".*NetAsm: A JIT Native Code Injection Library*," Jul. 25, 2008, [online], <http://netasm.codeplex.com/>, retrieved May 31, 2011, 3 pages.
Pistelli, Daniel, ".net Internals and Code Injection," 2008, [online], <http://ntcore.com/files/netint_injection.htm> , retrieved Jun. 10, 2011, 37 pages.
Pistelli, Daniel, ".net Internals and Native Compiling," [online], 2008, <http://ntcore.com/files/netint_native.htm>, retrieved Jun. 10, 2011, 30 pages.
Metula, Erez, ".net Framework Rootkits," 2008, [online], <http://www.applicationsecurity.co.il/english/NETFrameworkRootkits/tabid/161/Default.aspx>, retrieved Jun. 10, 2011, 3 pages.
Microsoft Corp., "*Ngen.exe (Native Image Generator)*," 2010, [online], <http://msdn.microsoft.com/en-us/library/6t9t5wcf.aspx>, retrieved Jun. 10, 2011, 15 pages.

(56) References Cited

OTHER PUBLICATIONS

Corney, Diane, and John Gough, "*PE-file Reader Writer API (PERWAPI)*," Feb. 7, 2010, [online], <http://perwapi.codeplex.com/>, retrieved Jun. 10, 2011, 1 page.
Broman, David, "*Profiler stack walking: Basics and beyond*," Oct. 6, 2005, [online], <http://blogs.msdn.com/b/davbr/archive/2005/10/06/profiler-stack-walking-basics-and-beyond.aspx>, retrieved Jun. 10, 2011, 8 pages.
Microsoft Corp.,"Profiling Overview," [online], <http://msdn.microsoft.com/en-us/library/bb384493(d=printer).aspx>, retrieved Jun. 10, 2011, 9 pages.
"PurifyPlus." IBM Software, [online], <http://www-01.ibm.com/software/awdtools/purifyplus/>, retrieved Jun. 10, 2011, 1 page.
Havin, Victor, and Raj Kesarapalli, "*Runtime analysis of asp.net Web services with Rational PurifyPlus*," Nov. 24, 2003, [online], <http://www.ibm.com/developerworks/rational/library/972.html>, retrieved Jun. 10, 2011 8 pages.
Cabral, Bruno, et al., "*Runtime Assembly Instrumentation Library*," Jan. 2005, [online], <http://rail.dei.uc.pt/>, retrieved Jun. 10, 2011, 1 page.
Cabral, Bruno, Paulo Marques, and Luis Silva, "RAIL: Code Instrumentation for .net," *Proceedings of the 2005 ACM Symposium on Applied Computing*, 2005, [online], <http://rail.dei.uc.pt/files/2005_sac2005.pdf>, retrieved Jun. 10, 2011, 6 pages.
Pistelli, Daniel, "Rebel.NET," 2008, [online], RAIL <http://ntcore.com/rebelnet.php>, retrieved Jun. 10, 2011, 2 pages.
Metula, Erez, "*Managed Code Rootkits: Hooking into Runtime Environments*," Apr. 23, 2010, [online], <http://www.appsec.co.il/en/system/files/Managed%20Code%20Rootkits%20presentation%20%28SOURCE%202010%29.pdf>, retrieved Jun. 10, 2011, 45 pages.
Prevx, cchecker.exe, Feb. 28, 2008, [online], http://www.prevx.com/filenames/2901065454801649092-X1/CCHECKER.EXE.html>, retrieved May 31, 2011, 2 pages.
Metula, Erez, "*Penetration Testing: [Tool] ReFrameworker 1.1*," Seclists.Org, Apr. 19, 2010, [online], <http://seclists.org/pen-test/2010/Apr/36>, retrieved May 31, 2011, 2 pages.
"*SQL Injection*," Aqtronix, Aug. 2, 2002, [online], http://www.aqtronix.com/?PageID=98http://www.aqtronix.com/?PageID=98, retrieved Oct. 25, 2011, 2 pages.
"*OWASP, The Open Web Application Security Project*," 2010, [online], https://www.owasp.org/index.php/Category:OWASP_ModSecurity_Core_Rule_Set_Project, retrieved Oct. 25, 2011, 3 pages.
Nasiml, "*CommonUrlScan Scenarios*," IIS, Jun. 24, 2008 [online], http://learn.iis.net/page.aspx/476/common-urlscan-scenarios/>, retrieved Oct. 26, 2011, 7 pages.
"perldoc.per.org, *Perl Programming Documentation*," perlsec Perl 5 version 14.1 documentation, [online], <http://perldoc.perl.org/perlsec.html#Taint-mode> , retrieved Oct. 26, 2011, 7 pages.
"*ThreadStatic, CallContext and HttpContext* in ASP.Net," Cup(of T), Nov. 2, 2005, [online], http://piers7.blogspot.com/2005/11/threadstatic-callcontext-and_02.html>, retrieved Oct. 26, 2011, 9 pages.
Pistelli, Daniel, "Rebel.NET *Guide*," 2008, [online], http://www.ntcore.com/files/rebelnet.htm, retrieved May 31, 2011, 8 pages.
ModSecurity "Open Source Web Application Firewall" ModSecurity FAQ [online] Version 2.0, Sep. 29, 2010 [Retrieved from the Internet Feb. 16, 2011] <URL:http://www.modsecurity.org/documentation/faq.html >.
Msdn "A Matter of Context" [online] Microsoft Corporation, Jan. 14, 2001 [Retrieved from the Internet Feb. 16, 2011] <URL:http://msdn.microsoft.com/enus/library/ms972109.aspx>.
Perl "Perl version 5.12.2 documentation—perlsec" [online] [Retrieved from the Internet Feb. 16, 2011] <URL:http://perldoc.perl.org/perlsec.pdf>.
Sentrigo Whitepaper "Hedgehog: Host-Based Database Activity Monitoring & Prevention" [online] Version 2.0, Apr. 2008 [Retrieved from the Internet Feb. 16, 2011] <URL:http://www.sentrigo.com/sites/default/files/Sentrigo_Hedgehog_-_Host-Based_Database_Activity_Monitoring_and_Prevention_v2.1.pdf>.
GreenSQL "What is GreenSQL?" [online] Retrieved from the Internet Feb. 16, 2011 <URL:http://www.greensql.net/about>.

* cited by examiner

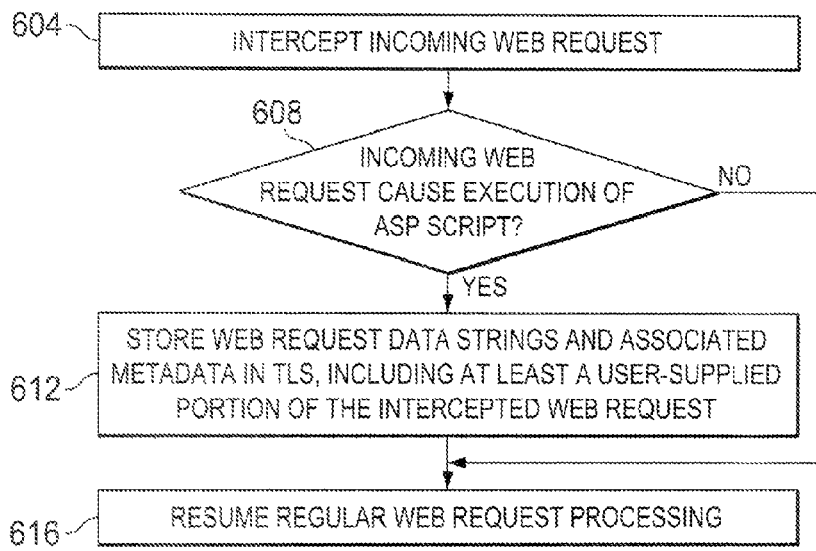
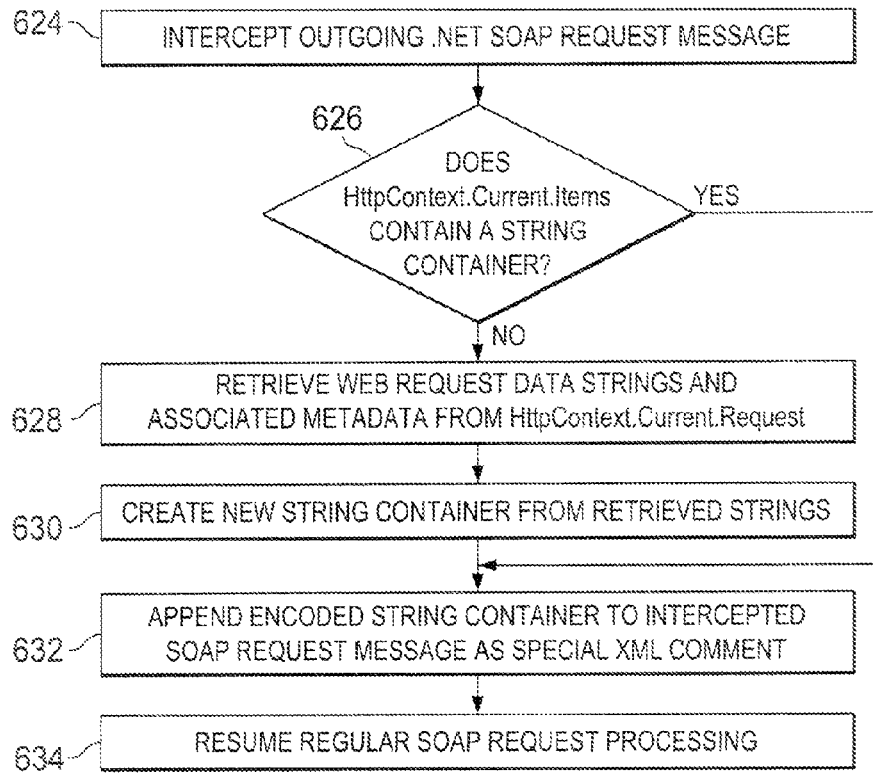

SYSTEM AND METHOD FOR INTERNET SECURITY

TECHNICAL FIELD

The present disclosure relates to internet security, and more particularly, to identification and prevention of Structured Query Language (SQL) injection attempts.

BACKGROUND

SQL injection is a code injection technique that exploits a security vulnerability occurring in the database layer of an application. The vulnerability is present when user input is either incorrectly filtered for SQL metacharacters (which can include, for example, string literal delimiter characters and other characters that may be dangerous in various circumstances) embedded in SQL statements used to access a database or when user input is not strongly typed and thereby unexpectedly executed. SQL injection attacks, or SQL insertion attacks, can allow unauthorized retrieval and modification of data in a database, providing attackers with access to sensitive and otherwise secure data through manipulation of SQL statements. In a worst case scenario, SQL injection may even allow the attacker to take full control of the database server.

SQL is a database computer language designed for managing data in relational database management systems (RDBMS), and provides commands and instructions including data insert, query, update and delete, schema creation and modification, and data access control. Many web-based applications and web services process user input, or web requests, to generate a database query in SQL (or in a SQL statement or SQL code) for accessing a database according to the web service's operations and the user input. SQL injection attacks can use malicious user input to cause the web service to generate SQL statements for accessing the associated database that far exceed the scope of the web service and database creator's intentions, including the provision of data to which the user may not normally be granted access.

A web application requiring user authentication provides an example of SQL injection. Upon accessing the web application, a visitor or user can encounter a login page requesting a user name and a password. A typical web application may query a database to determine if the user name and password pair is valid, authenticating the visitor as the identified user if validated or denying the login attempt otherwise. A common practice in performing such a database query is to construct, during the web application's processing, a string representing the database query using string concatenation or string formatting facilities to combine a predefined SQL code with the input received from the visitor, the result of which is a single string, or query string. Generally, the database can only differentiate SQL code from data (or user input) to the extent that the data is properly delimited during the database query's construction. Some web applications may not check the visitor's input for characters having special meaning in SQL statements and database processing. As a result, a malicious visitor could use one of the special characters to transcend the boundary between the SQL code and the data intended by the web application, thus altering the logic of the query by injecting the malicious user's own SQL code into the generated or constructed query string.

An example of the above event may use the following pseudocode representing the programming in the web application which constructs the underlying SQL database query. Generally, the SQL injection vulnerability may be considered to exist in the web application programming, in that the web application code generally constructs the SQL database query without performing a check as to whether the generated query is malicious. The following is an example of web application or web service logic that may be used to insecurely construct a database query:

```
query = "SELECT * FROM accountsTable WHERE
usernameColumn = '" + username + "' AND
passwordColumn = '" + password + "';"
``` where "+" is a string concatenation operator. The terms username and password each represent a string variable containing the eponymous piece of user input. If the supplied username is "Mitch", and the supplied password is "Wildcats", the resulting database query string would be as follows:

```
SELECT * FROM accountsTable WHERE
usernameColumn = 'Mitch' AND passwordColumn =
'Wildcats';
```

In the query, the single-quote character "'" is used to delimit string data. If the web application does not properly reject or sanitize input containing single-quotes, for example, a malicious visitor can inject SQL code as described above. For instance, if the username is entered as "Mitch';--" and the password is entered as "AnythingGoesHere", the following query string is generated as a result:

```
SELECT * FROM accountsTable WHERE
usernameColumn = 'Mitch';--' AND passwordColumn =
'AnythingGoesHere';
```

The "'" character in the input associated with the value username artificially and prematurely ends the first portion of the query recognized as string data within the SQL code. The ";" character denotes an artificial end to the query string, and the "--" sequence renders the remainder of the query string as a comment in the SQL code, causing the information after the "--" sequence to be ignored by the database. The resulting query string processed by the database therefore only checks the username, but not the password, and can enable the malicious visitor to login as any user without knowing the correct password. Such malicious input, crafted to manipulate the meaning of a database query generated by the web application, constitutes one example of a SQL injection attack or SQL injection exploit. In alternative instances, SQL injection attacks can be used to access and return data and information stored in the database. For example, a SQL injection exploit can be used to return all data within a database in instances where the query is associated with the retrieval and display of data, and where the database and/or web application exists without appropriate protections.

SUMMARY

Systems and methods for preventing SQL injection attacks are described in the present disclosure. In one instance, a computer implemented method comprises (i) intercepting a web request associated with a web service at a first software hook in a first web service execution context, (ii) persisting at least a portion of the intercepted web request in a storage location associated with the first software hook and accessible to at least one additional execution context, (iii) intercepting a database query generated by at least one web service processing operation at a second software hook associated with the execution of the query, wherein the query is generated in response to the intercepted web request and the second hook retrieves the persisted portion of the intercepted web request, (iv) comparing a portion of the persisted portion of the intercepted web request with at least a portion of the intercepted database query, and (v) determining, prior to the query being executed, whether the query corresponds to a potential SQL injection attack.

While generally described as computer implemented software embodied on tangible media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 6A is a flowchart of an example method for intercepting, via a software hook, an incoming web service request associated with an ASP script, in an example embodiment of the present disclosure.

FIG. 6B is a flowchart of an example method for intercepting and storing, via a software hook, information associated with an outgoing message associated with the operations of a web service associated with an ASP.NET script, in an example embodiment of the present disclosure.

DETAILED DESCRIPTION

Figure 1:
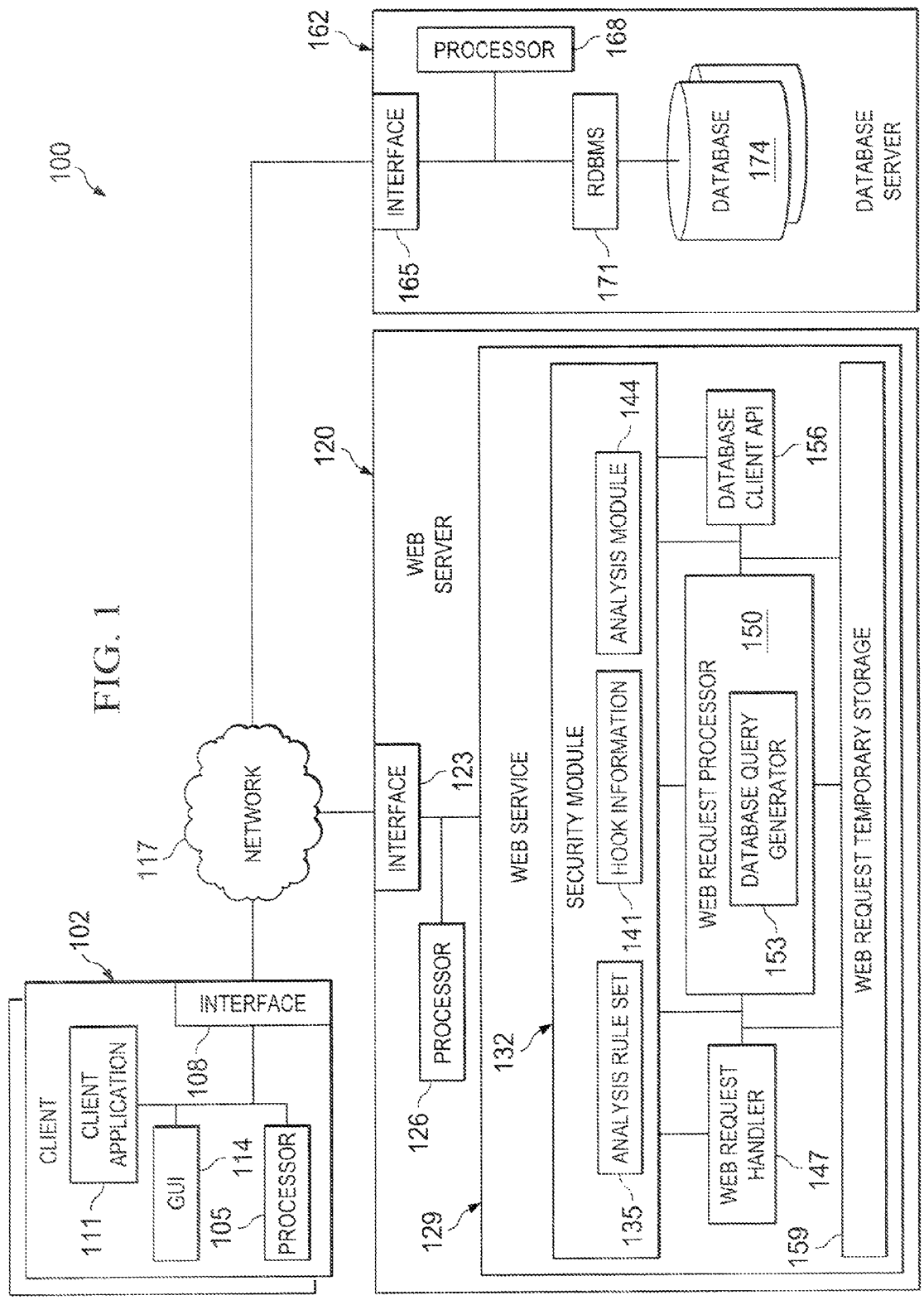
FIG. 1 illustrates an example environment for identifying and preventing SQL injection attacks.

This disclosure generally describes computer systems, software, and computer implemented methods for identifying and preventing SQL injection attacks and SQL injection exploits. For example, the present disclosure describes a method of linking an end-user's request for a web page (also defined as a "web request" or an "HTTP request") with database queries (also "SQL queries") issued by an associated web server or other back-end systems during the handling and processing of the web request. While such links may not normally exist, or may exist in such a way that third-party software cannot access them, the present disclosure enables third-party security software to analyze a generated database query in the context of the web request that caused the generation of said database query. The systems and methods provided within the present disclosure can be used to facilitate security analysis of user input associated with web requests (e.g., to a web-based application or to a web service) and, more specifically, to detect potential attacks attempting to exploit SQL injection vulnerabilities within web pages and web services.

In general, a method for establishing a programmatic link between a received web request and any database query issued as a result of processing the received web request is provided. Various software hooks, which may include code hooks, shims, extensions, and/or filters, are installed at one or more predetermined locations along the code path from where a web request is received to where associated database queries are issued. In one example, a software hook may comprise a detour hook. A detour hook can intercept the information provided to the location of the software hook, reroute the information to a location associated with a security module, and return the same or modified information back to the location of the software hook. In other instances, the software hook may include a custom database driver or connector. Each hook retrieves data (and/or references to data, such as pointers) from the execution context in effect at the time the hook executes, and stores that data in a location accessible to the next execution context associated with processing the web request such that the data is accessible to the next hook in the processing chain of events. The data associated with the original web request (and/or the references to the web request itself) is available within the execution context in which a database query is eventually issued, assuming the database query was caused by a web request. In some instances, the software hooks may be considered of one of two types: intermediate hooks and terminal hooks. Intermediate hooks may generally include software hooks that are associated with operations for processing a particular web request prior to a database query being generated. Terminal hooks, on the other hand, can include the software hooks for intercepting database queries generated in response to a particular web request. The terminal hooks can identify the generated database query and retrieve information associated with the original software hook, where appropriate. In some instances, terminal hooks may be associated with a database client or database API (e.g., ODBC API hooks or Command-type method hooks) used in the processing of web requests in a particular web service.

The systems and methods of the present disclosure can enable third-party, web server security software (such as a Host-Based Intrusion Prevention System (HIPS) or a Web Application Firewall (WAF)) to analyze a database query in the context of user input included within a received web request that was responsible for generating the database query. The present disclosure can allow security software to detect and deny (or sanitize) SQL injection attacks prior to the database queries being executed against a database or table for the web service or web-based application associated with the original web request. One benefit of the present disclosure is that third-party security software solutions can be implemented without the first-party software being modified, in some instances.

Alternative approaches to analyzing database queries for SQL injection attacks currently provide various drawbacks. For example, network-based security solutions (such as a Network Intrusion Prevention System (NIPS)) must parse all encapsulating protocols over which the web request and/or database query are transmitted, including those instituting encryption (which may require sharing of an otherwise secure encryption key), and must do so according to the same parsing rules as the software or systems receiving the request or database query implement. Depending on the location of the system, a NIPS may have difficulty prohibiting, rather than simply observing, the request, and generally has no opportunity to monitor a database query where the source and database reside on the same system, as the database query never traverses the network. Another shortfall of other alternative systems is the inability to correlate generated database queries to the exact web request that caused the database query to be generated (including the portions explicitly supplied by the user). Most security solutions eschew such correlation and attempt to detect SQL injection attacks through whitelists of potential database query templates built by learning- or behavior-based technologies, and/or by searching the database queries for "known bad" signatures of common attacks. Both approaches have disadvantages. A learning-based solution may produce false positives, meaning it incorrectly detects a benign input or database query as malicious, if the input or database query was not previously observed during learning mode. Such false positives may occur during the use of features of the website that were not sufficiently exercised during learning mode and features that were added or changed after learning mode concluded. Further, a learning-based solution may not provide full protection while in learning mode. It may also learn malicious input or database queries and thereby produce false negatives, meaning it fails to detect the input or database queries as malicious, when similar attacks are later observed. A signature-based solution may be prone to false negatives due to its inflexible set of attack signatures, which may in some cases be knowingly weakened by the developers in order to avoid causing false positives, and which may be evaded by an attacker who has knowledge of the signatures. Neither a learning-based approach nor a signature-based approach inherently enables a solution to safely and properly sanitize suspicious database queries.

The present disclosure provides additional benefits based on the hooking approach used therein. For instance, executing the hooks adds the overhead of security analysis to the thread or threads (more abstractly, the code path) responsible for processing a web request, which can allow the overhead to scale linearly with the number of web requests received. Further, properly placed hooks allow certain embodiments of the present disclosure to analyze web requests and database queries exactly as they are received and transmitted by the web page, web service, or web-based application, thereby obviating the need to perform any independent protocol parsing that could otherwise pose a security weakness in the system itself (e.g., if the independent parsing was implemented improperly, or if the parsing logic of the web service or script processor upon which it is modeled changes in the future).

FIG. 1 illustrates an example environment 100 implementing various features for a web-based security system operable, at least in part, to identify and prevent SQL injection attacks. The illustrated environment 100 includes, or is communicably coupled with, a plurality of clients 102, a web server 120, and a database server 162. At least some of the clients 102 and servers 120, 162 may communicate across or via network 117. In general, environment 100 depicts an example configuration of a system capable of intercepting web requests sent from one or more of the clients 102, identifying the user-provided input associated with those web requests, installing software hooks in a web service 129 by operations of a security module 132, processing the operations associated with the intercepted web requests, and, in response to a database query being generated after processing a particular web request, comparing the particular web request (or at least the user-supplied portion of the particular web request) with the generated database query to identify and prevent SQL injection attacks.

In general, the web server 120 is any server that stores and executes operations associated with a web service 129 or another web-based application. The web server 120 can receive web requests associated with the web server 129 from the clients 102 associated with the illustrated system 100 (as well as clients and other participants or entities not illustrated in FIG. 1). For example, the web server 120 may be a Java 2 Platform, Enterprise Edition (J2EE)-compliant application server that includes Java technologies such as Enterprise JavaBeans (EJB), J2EE Connector Architecture (JCA), Java Messaging Service (JMS), Java Naming and Directory Interface (JNDI), and Java Database Connectivity (JDBC). In some instances, the web server 120 may store a plurality of various other applications and/or web services, while in other instances, the web server 120 may be a dedicated server meant to store and execute a particular web service 129 or web application and its related functionality. In some instances, the particular web service 129 associated with the web server 120 may represent a web-based application accessed and executed by the associated clients 102 to perform the programmed tasks or operations of the corresponding web service 129.

At a high level, the web server 120 comprises an electronic computing device operable to receive, transmit, process, store, or manage data and information associated with the environment 100. The web server 120 illustrated in FIG. 1 can be responsible for receiving application requests from one or more clients 102 or client applications 111 associated with one or more of the other clients 102 included in an illustrated client-server relationship or system, responding to the received requests by processing said requests in the web service 129, and sending the appropriate responses from the web service 129 back to the requesting client 102, client application 111, or other requesting entity or application. The web service 129 may, in some instances, process and respond to local requests from a user locally accessing the associated web server 120. Accordingly, in addition to requests from the external clients 102 illustrated in FIG. 1, requests associated with a web service 129 may also be sent from internal users, external or third-party customers, and other automated programs or applications communicably coupled to network 117, as well as any other appropriate entities, individuals, systems, or computers.

As used in the present disclosure, the term "computer" is intended to encompass any suitable processing device. For example, FIG. 1 illustrates a single web server 120 associated with a single web service 129. However, environment 100 can be implemented using any number of web servers 120 associated with one or more web services 129 or other web-based applications, as well as computers other than servers, including a server pool. Indeed, each web server 120 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, the illustrated web server 120 may be adapted to execute any operating system, including Linux, UNIX, Windows, Mac OS, or any other suitable operating system. According to one implementation, one or more web servers 120 may also include, or be communicably coupled with, a mail server.

In the illustrated implementation of FIG. 1, the web server 120 includes an interface 123, a processor 126, and a web service 129. The interface 123 is used by the web server 120 to communicate with other systems in a client-server or other distributed environment (including within environment 100) connected to the network 117 (e.g., an associated client 102 or the set of cloud-based services, as well as other systems or entities communicably coupled to the network 117). FIG. 1 depicts a client-server environment, although environment 100 (or a portion thereof) may exist within or as a cloud computing network or cloud computing-based system. Various other implementations of the illustrated environment 100 can be provided to allow for increased complexity of the illustrated web service 129, such as through the use of a plurality of servers to represent the web server 120, or a plurality of different web services 129 being combined and/or associated to complete certain functionality. Generally, the interface 123 comprises logic encoded in software and/or hardware in a suitable combination and operable to communicate with the network 117. More specifically, the interface 123 may comprise software supporting one or more communication protocols associated with communications such that the network 117 or interface's hardware is operable to communicate physical signals within and outside the illustrated environment 100.

The web server 120 may be communicably coupled with a network 117 that facilitates wireless or wireline communications between the components of the environment 100 (i.e., between the web server 120, the clients 102, and the database server 162), as well as with any other local or remote computer, such as additional clients, servers, or other devices communicably coupled to network 117, including those not illustrated in FIG. 1. While the network 117 is depicted as a single network in FIG. 1, network 117 may be comprised of more than one network without departing from the scope of this disclosure, so long as at least a portion of the network 117 may facilitate communications between senders and recipients. In some instances, the network 117 may include all or a portion of a set of cloud-based services, storage, and other information. The network 117 may be all or a portion of an enterprise or secured network, while in another instance, at least a portion of the network 117 may represent a connection to the Internet. In some instances, a portion of the network 117 may be a virtual private network (VPN), such as, for example, the connection between the web server 120 and at least one of the clients 102. Further, all or a portion of the network 117 can comprise either a wireline or wireless link. Example wireless links may include 802.11a/b/g/n, 802.20, WiMax, and/or any other appropriate wireless link. In other words, the network 117 encompasses any internal or external network, networks, sub-network, or combination thereof operable to facilitate communications between various computing components inside and outside the illustrated environment 100. The network 117 may communicate, for example, Internet Protocol (IP) packets, Frame Relay frames, Asynchronous Transfer Mode (ATM) cells, voice, video, data, and other suitable information between network addresses. The network 117 may also include one or more local area networks (LANs), radio access networks (RANs), metropolitan area networks (MANs), wide area networks (WANs), all or a portion of the Internet, and/or any other communication system or systems at one or more locations. The network 117, however, is not a required component in all implementations of the present disclosure.

As illustrated in FIG. 1, the web server 120 includes a processor 126. Although illustrated as a single processor 126 in the web server 120, two or more processors may be used in the illustrated web server 120 according to particular needs, desires, or particular embodiments of environment 100. Each processor 126 may be a central processing unit (CPU), a blade processor, an application specific integrated circuit (ASIC), a field-programmable gate array (FPGA), or another suitable component. Generally, the processor 126 executes instructions and manipulates data to perform the operations of the web server 120, and, specifically, the functionality associated with the corresponding web service 129 and security module 132. In one implementation, the server's processor 126 executes the functionality required to receive and respond to requests and instructions from one or more clients 102, as well as the functionality required to perform the other operations of the associated web service 129.

Regardless of the particular implementation, "software" may include computer-readable instructions, firmware, wired or programmed hardware, or any combination thereof on a tangible and non-transitory medium operable when executed to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components, as appropriate. In the illustrated environment 100, the processor 126 executes the corresponding web service 129 stored on the web server 120, as well as the functionality associated with the security module 132. In some instances, the web server 120 may be associated with two or more web services 129.

At a high level, the web service 129 is any application, program, module, process, or other software that may execute, change, delete, generate, or otherwise manage information associated with a web server 120. In some instances, the web service 129 may operate in response to and in connection with one or more requests received from an associated client 102. In some instances, information associated with a request may be relayed by or provided via the network 117, as well as directly from a particular client 102. The web service 129 may represent a web-based application accessed and executed by remote client 102 via the network 117 (e.g., through the Internet, or via a cloud-based network). Further, while illustrated as internal to the web server 120, one or more processes associated with the web service 129 may be stored, referenced, or executed remotely. For example, the illustrated web service 129 may be associated with a plurality of different, individual web services, where the illustrated web service 129 combines two or more of the web services to perform various operations and processing of received requests. In some instances, one or more of those individualized web services may be remotely called by the overall web service 129 (or during the web service's 129 execution), while another portion of the overall web service 129 may be an interface object or agent bundled for processing and operation at a remote client 102. Moreover, any or all of a particular web service 129 may be a child or sub-module of another software module or enterprise application (not illustrated) without departing from the scope of this disclosure. Still further, portions of the web service 129 may be executed or accessed by a user working directly at the corresponding web server 120, as well as remotely at a corresponding client 102.

The web service 129 may be an application programming interface (API) or Web API accessed, for example, via a hypertext transfer protocol (HTTP) request from a remote system, where the web service 129 performs one or more operations in response to the HTTP request. In some instances, Simple Object Access Protocol (SOAP) messages can be used for exchanging structured information within the web service 129 itself, or for information sent by or to a particular client 102 or other entity. In some instances, the HTTP request sent to the web service 129 (i.e., from client 102 via network 117) may include one or more parameters, variables, or other information associated with the web service's 129 operations. By using those parameters, in some instances with other predefined code, processing, or operations, the web service 129 may be capable of generating a responsive message or set of information as a response to the requester. In some instances, and as illustrated in FIG. 1, the web service 129 may be associated with at least one database, such that the web service 129 can receive information associated with a request for information, generate a database query based on that received information (and/or other predefined information), and access a particular database to retrieve information therefrom. The illustrated web service 129 includes a web request handler module 147, a web request processor module 150 (which includes a database query generator module 153), and a database client API 156. Each of these modules and APIs provide different portions of functionality to the web service 129. For example, the web request handler module 147 can perform initial processing operations associated with the receipt of a web request (or HTTP request) associated with the underlying web service 129. The web request processor module 150 can perform one or more operations on the web request, or a subset of information included in the web request (such as user-supplied input), according to the programming and functionality associated with the web service 129. In some instances, the functionality may include determining, based on the received web request, a set of operations to be performed by the web service 129. In some instances, one or more of those operations may include the generation of a database query based, in some instances, on at least some of the information included within the initial web request. In those instances, the database query generator module 153 of the web request processor 150 can be used to generate a database query according to the operations associated with the web service 129. Once a database query is generated, the web service 129 can provide the database query to the database client API 156, which can be used to provide access to a particular database system associated with the web service 129. In some instances, one web service 129 may be associated with a plurality of databases and/or database systems, such that the web request processor 150 may determine which of the associated databases to send and execute a particular database query against. As illustrated in FIG. 1, the web service 129 is associated with a single set of databases 174 within a database server 162.

The database server 162 can receive the database queries from and provide query results to the web service 129 (or the client 102) via network 117. The database server 162 includes an interface 165 and a processor 168 similar to those described with regard to interface 123 and processor 126 of the web server 120. The processor 126 executes a database management system, such as the relational database management system (RDBMS) 171 illustrated in FIG. 1. The RDBMS 171 receives the database query via interface 165 (and network 117), and uses its capabilities to execute the received database query against one or more databases 174 located at or communicably coupled to the database server 162. The RDBMS 171 may access databases internal and/or external to the database server 162, such as databases 174 located in a cloud-based network via network 117. In response to executing the database query against the appropriate database, the RDBMS 171 receives and returns a set of database query results. The database query results can be returned to the web service 129 for further processing by the web service, and further allowing the web service 129 to transmit or present the query results to one or more clients 102 in response to the original web request. In some instances, the web server 120 and the database server 162 may comprise a single server or system, such that the database query and database query results would not leave or be sent between the servers, but rather through internal system communications.

The security module 132 of FIG. 1 comprises security software for installing software hooks within an application or other software. In the illustrated example, the security module 132 installs one or more software hooks at various locations within and associated with the web service 129. In the present disclosure, hooking refers to a range of techniques used to alter or augment the behavior of an application or software components by intercepting function calls, messages, and events passed between software components. The code that handles the intercepted function calls, events, or messages is referred to a hook. In some instances, software hooks are inserted while software is already running/executing, although the software hooks may also be employed prior to the application being started. In the present example, various hooks, including code hooks, shims, extensions, and/or filters, are installed at predetermined locations along the code path traversing the time when the web request is initially received by the web service 129 to where database queries are generated. The hooks themselves are used to retrieve data and/or references to the data associated with the operations of the web service 129 (or suitable application) for a particular execution context within the web service 129 at the time the hook executes. The data retrieved by the hook is then stored or referenced in a location that will be accessible in the next execution context, and thereby available to the next execution context and the next software hook. In some instances, the data can be stored or referenced in web service temporary storage 159.

The web service temporary storage 159 may be any memory or database module and may take the form of volatile or non-volatile memory including, without limitation, magnetic media, optical media, random access memory (RAM), suitable types of read-only memory (ROM) such as electrically erasable read-only memory (EEROM) or electrically erasable programmable read-only memory (EEPROM), removable media, or any other suitable local or remote memory component. The web service temporary storage 159 may store various objects or data, including classes, frameworks, applications, backup data, business objects, jobs, web pages, web page templates, database tables, process contexts, repositories storing services local to the corresponding web server 120, and any other appropriate information including any parameters, variables, algorithms, instructions, rules, constraints, or references thereto associated with the purposes of the corresponding web server 120 and its web service 129. In some instances, the web service temporary storage 159 may be local to the web service 129 and the web server 120, while in other instances the web service temporary storage 159 may be remote from the web service 129 and, in some cases, the web server 120 itself, although communicably coupled to the web service 129. Further, the web service temporary storage 159 may be separate from other memory within the web server 120, or may be a portion of the memory inherent to the web server 120 and the web service 129, such as a thread local storage or other storage location. In some instances, the web service temporary storage 159 may be a location associated with one or more SOAP or other messages sent between components of or associated with the web service 129. For example, the information associated with one execution context can be appended to a message and provided to the next execution context initiated in response to the message. The appended information can be retrieved from the message and used for further processing. If a new message is to be sent, the previously appended information can again be appended to the new message, allowing a third execution context to receive and access the information. Using one or more of these methods, information associated with at least a portion of the originally received web request can be maintained and propagated throughout multiple threads and processes used throughout the operation of the web service 129.

In one embodiment, software hooks can be associated with the operating system of the web server 120. The security module 132 can access the operating system's means of dynamically loading and unloading dynamic linked libraries (DLLs), allowing the security module 132 to be notified whenever a DLL of interest loads or is removed from the memory associated with the web service 129 or other associated software. In some instances, one or more DLLs may have been loaded prior to the security module 132 beginning its operations. In those instances, the security module 132 can process each DLL of interest already resident in memory similar to when a new DLL is loaded and identified by the security module 132. In both instances, each DLL of interest to the security module 132, such as those associated with the processing of a web request within the web service 129 or web-based application, is examined. In some instances, software hooks may be added based upon the file name of each examined DLL.

Examples of file names of DLLs in which a software hook may be installed include one or more of the following:

W3SVC.DLL and W3CORE.DLL. These DLLs are components of the World Wide Web service of Microsoft's Internet Information Services (IIS). The software hooks are installed in association with the functionality that allows these DLLs to instantiate Component Object Model (COM) objects, such that the security module 132 can automatically spread itself to any worker processes instantiated to fulfill received web requests and perform the associated web service 129. The security module 132 can receive information from these DLLs and determine whether one or more new processes will be generated. New processes can be identified and followed by the security module 132, allowing the security module 132 to inject one or more software hooks into each appropriate process or thread instantiated by or associated with these DLLs.

ASPNET_ISAPI.DLL and WEBENGINE.DLL. These DLLs are components of the Microsoft .NET Framework that serve as the interface between IIS and ASP-.NET. The security module 132 can hook their ability to create new processes, allowing the software hooks to be spread to any ASP.NET worker processes created/instantiated to service a web request. The security module 132 may also install software hooks within the functionality used by these DLLs to create .NET application domains, providing the security module 132 an opportunity to instantiate itself, or additional software hooks, in any new IIS-related application domain. Using the installation and/or those software hooks, the security module 132 can install further hooks in any .NET Framework system or method of interest.

ASP.DLL and ASP51.DLL. These DLLs provide the interface between IIS and ASP, hosting the majority of the functionality necessary to implement ASP. The security module 132 can locate, for example, a private function associated with the execution of ASP scripts, such as by consulting a table of known addresses organized by recognized DLL versions, and then, if necessary, by scanning the respective DLL's code for specific patterns and signatures in order to identify the start of the function. In some instances, code scanning may be performed only as a fallback if the security module 132 does not recognize the system's ASP.DLL or ASP51.DLL version. Once located, the security module 132 hooks the private function so that it can intercept web requests for ASP scripts after they are initially parsed but before they are executed. By doing so, the security module 132 can retrieve the server variables provided by IIS to describe the request, any query string (GET) or form (POST) name-value pairs parsed by ASP, and any simple or dictionary cookie name-value pairs parsed by ASP from the "Cookie" HTTP request header. In general, this information constitutes the information provided by an end user when initiating a particular web service through an ASP script. The security module 132 can store this information in a string container for later use and access by one or more other processes, threads, or other execution contexts throughout the web service's execution.

ODBC32.DLL. This DLL exposes the database connectivity interface by which an ASP script can access a database, and features a standardized set of API functions. The security module 132 can insert one or more software hooks into one or more of the API functions in order to allow the security module 132 to intercept database queries issued by ASP scripts before the database queries reach the database.

The security module 132 can insert software hooks into these and other DLLs and locations within the web service 129. Information on a set of predetermined locations into which software hooks are to be initially installed can be included within a set of hook information 141. Additionally, software hooks installed in or associated with one or more processes or threads due to propagation within a particular DLL or other software component can be tracked and also stored in the set of hook information 141. In general, each software hook can store the information associated with the execution context at the particular software hook's location, retrieve information associated with a previous execution context for use or inclusion in a future execution context, and provide relevant information to the security module 132 for analysis prior to allowing the web service 129 or other processes associated with a particular software hook to continue. For example, when a database query is intercepted, the database query can be analyzed by the analysis module 144 of the security module 132. The analysis module 144 can review the database query in light of the information associated with the original web request to determine if a particular database query is malicious or would cause unforeseen or undesirable results, and whether the database query can be adequately sanitized in order to perform the intended operations associated with the original web request without allowing an SQL injection mistake or attack to occur.

In one instance, each database query is examined, character-by-character, by a state machine associated with the analysis module 144. The analysis module 144 can have a general character-level understanding of SQL syntax, as well as an understanding of idiosyncrasies of one or more different types of SQL (i.e., MySQL). The analysis module 144 can perform basic identification of tokens, including string literals, name strings, and SQL keywords such as FROM, INTO, LIKE, and WHERE, allowing the analysis module 144 to make assumptions and decisions regarding which characters should delimit any string that follows the identified token. At the beginning of each identified token, the analysis module 144 can compare the portion of the database query beginning there to each string captured from the original web request (or HTTP request). The database query and captured strings can be analyzed in a raw form and with common transformations applied to strings (e.g., uppercase/lowercase conversions, HTML escaping and unescaping, URL encoding and decoding, etc.). If the string matches a portion of the database query, and if it contains a character that would modify the syntax of the database query, then the database query can be rejected or sanitized (i.e., modified to remove any offending character and to place the database query into a state safe for use with the database). An example of an improperly modified database query may include where a string literal is wrapped in single quotes containing an unescaped single quote from the original web request. In those instances, the unescaped single quote may be removed from the string literal, replaced in the database query, and the analysis module 144 and security module 132 may allow the database query to be performed.

The security module 132 may be used in a second embodiment by registering the security module 132 as a COM object, installing into the Microsoft .NET Framework's Global Assembly Cache (GAC), and adding it to the list of .NET Simple Object Access Protocol (SOAP) extensions via programmatic modification of the "soapExtensionTypes" tag in the .NET Framework's "machine.config" file. The operation of the security module 132 is twofold: it operates in conjunction with an unmanaged component to hook the ASP.NET database querying methods in processes and application domains of interest, and SOAP communications are intercepted, allowing the security module 132 to propagate information between .NET Web Services client and server execution contexts. The SOAP extension functionality allows information associated with a web or HTTP request to be made accessible across application domain, process, and machine boundaries where the web application uses .NET Web Services, while the method hooks permit interception and analysis of database queries. In some simple instances where .NET Web Services are not used and information is not shared across systems, the .NET Framework may provide access to the web request being processed through the HttpContext.Current.Request property. In those limited instances, additional hooks may not be necessary in order to propagate the web or HTTP request throughout the process.

Database queries are generally executed in ASP.NET by instantiating a Command-type object, assigning a database query string to its CommandText property, and invoking one of its Execute- or Prepare-type methods. The security module 132 thus hooks methods of known Command-type objects, including, for example OdbcCommand, OleDbCommand, OracleCommand, and SqlCommand. Invocations of each hooked method are redirected to a hook procedure with a matching signature associated with the security module 132. The hook procedure of the security module 132 accesses a Command-type object's CommandText property to obtain the database query to be executed, retrieves the strings of the causative web or HTTP request, and passes the information to the analysis module 144 for analysis. If the database query is approved, the hook procedure can call the original method code and return the result to its own caller. If the database query is modified by the analysis module 144 and/or the security module 132, the hook procedure can temporarily replace the CommandText property with a modified database query, while the original method code executes if the database query can be sanitized. Otherwise, the hook procedure can return an error or throw an exception without invoking the original method code, thereby preventing the execution of a database query possibly associated with a SQL injection attack.

The security module 132 illustrated in FIG. 1 includes an analysis rule set 135 for providing various security rules, protocols, and other information associated with the analysis. For example, the analysis rule set 135 may define which transformations are to be monitored or used when comparing database queries and original web requests. Additionally, the analysis rule set 135 can include information on when and how to sanitize potential malicious database queries, including lists of user names or other criteria defining when to always sanitize, as well as lists of known malicious users whose queries should always, or if in doubt, be rejected. The analysis rule set 135 can be provided with the initial installation of the security module 132. In some instances, administrators and users associated with the web service 129 and having proper permissions can add user-specified rules and protocols, thereby allowing the analysis functions to be tailored to a particular use case.

The illustrated environment of FIG. 1 also includes one or more clients 102 associated with the web server 120 and its corresponding web service 129. Each client 102 may be any computing device operable to connect to or communicate with at least the web server 120 using a wireline or wireless connection, via the network 117, or another suitable communication means. In general, each client 102 may include a processor 105, an interface 108, a graphical user interface (GUI) 114, and a client application 111. In general, client 102 comprises an electronic computer device operable to receive, transmit, process, and store any appropriate data associated with the environment 100 of FIG. 1. It will be understood that there may be any number of clients 102 associated with, or external to, environment 100. For example, while illustrated environment 100 includes two clients 102, alternative implementations of environment 100 may include a single client 102 or three or more clients 102 communicably coupled to the network 117 and web server 120, as well as other clients 102 not specifically connected to or associated with a particular web server 120. In some instances, at least one client 102 may be associated with an administrator of the web server 120 and/or web service 129, and may be capable of modifying information and data associated with the web server 120, as well as each individual web service 129 and one or more security modules 132. Additionally, there may also be one or more additional clients 102 external to the illustrated portion of environment 100 capable of interacting with the environment 100 via the network 117. Further, the terms "client," "user," and "visitor" may be used interchangeably as appropriate without departing from the scope of this disclosure. Moreover, while each client 102 is described in terms of being used by a single user, this disclosure contemplates that many users may use one computer, or that one user may use multiple computers.

The GUI 114 associated with each client 102 may comprise a graphical user interface operable to, for example, allow the user of a client 102 to interface with at least a portion of a web server 120 for any suitable purpose, such as inputting and interacting with information and data associated with a particular web service 129 within the illustrated environment (or otherwise communicably connected thereto, such as through network 117), as well as any other suitable application. Generally, the GUI 114 provides the particular user with an efficient and user-friendly presentation of business data provided by or communicated within the system. The GUI 114 may comprise a plurality of customizable frames or views having interactive fields, pull-down lists, and buttons operated by the user. For example, the GUI 114 may provide interactive elements that allow a user to interact with a particular web service 129. Various portions, displays, and interfaces of the web service 129 may be presented and accessible to the user through the GUI 114, such as through a client application 111 (such as a web browser, client-based agent, or other software application located at the client 102). Generally, the GUI 114 may provide general interactive elements that allow a user to access and utilize various services and functions of the client application 111, as well as the functions associated with the web server's 120 web service 129. The GUI 114 is often configurable, supports a combination of tables and graphs (bar, line, pie, status dials, etc.), and is able to build real-time portals, where tabs are delineated by key characteristics (e.g., site or micro-site). Therefore, the GUI 114 contemplates any suitable graphical user interface, such as a combination of a generic web browser, intelligent engine, and command line interface (CLI) that processes information in the platform and efficiently presents the results to the user visually.

As used in this disclosure, each client 102 is intended to encompass a personal computer, touch screen terminal, workstation, network computer, kiosk, wireless data port, smart phone, personal data assistant (PDA), one or more processors within these or other devices, or any other suitable processing device. For example, each client 102 may comprise a computer that includes an input device, such as a keypad, touch screen, mouse, or other device that can accept user information, and an output device that conveys information associated with the operation of the associated web server 120 and/or the client 102 itself, including digital data, visual information, or the GUI. Both the input and output device may include fixed or removable storage media such as a magnetic storage media, CD-ROM, or other suitable media, to both receive input from and provide output to users of client 102 through the display, namely, the GUI 114.

The processor 105 and the interface 108 of each client 102 may be similar to those described in connection with the web server 120, although alternative implementations of one or more of these components may be used, as well as implementations where additional components may also be included. In general, the processor 105 is used to execute the operations associated with the client 102, while the interface 108 is used by the client 102 to communicate with other systems in a client-server or other distributed environment (including within or external to environment 100) by, for example, connections to network 117.

While FIG. 1 is described as containing or being associated with a plurality of elements, not all elements illustrated within environment 100 of FIG. 1 may be utilized in each alternative implementation of the present disclosure. For example, although FIG. 1 depicts a client-server environment implementing the connections between the client 102 and the web server 120, any of the components, and particularly those associated with the web server 120, can be located in a cloud-based networking environment, whereby one or more of the processes associated with FIG. 1 are performed by a plurality of nodes and processes distributed throughout the cloud-based network. Further, although FIG. 1 depicts the web server 120 and the database server 162 as separate entities, in some instances the two may be combined, so that the web server 120 and the database server 162 reside on a single server or system. Additionally, one or more of the elements described herein may be located external to environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes, in addition to those purposes described herein.

Figure 2A:
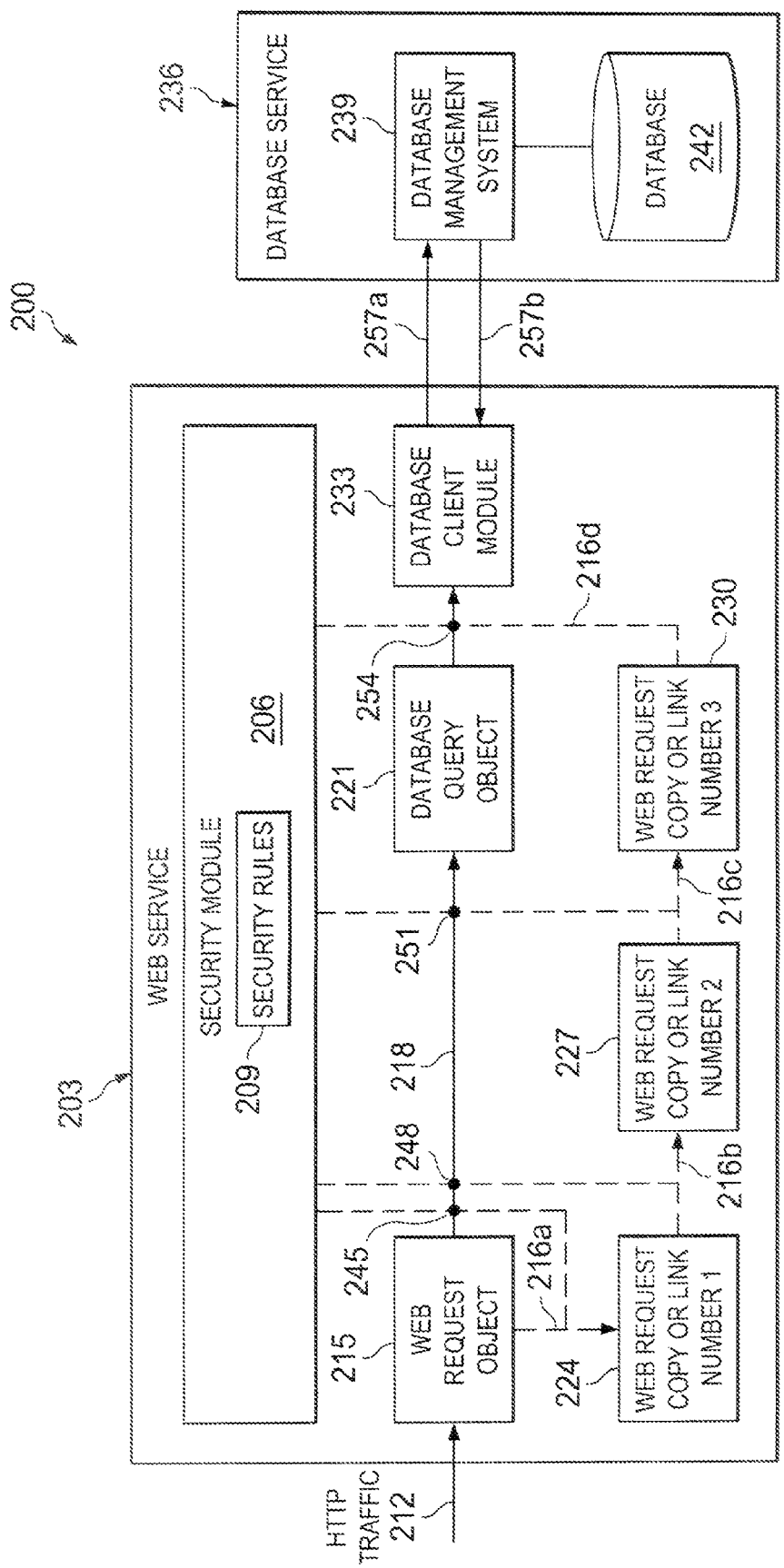
FIG. 2A is an abstract overview of an example embodiment of the present disclosure within a web service process.

FIG. 2A is an abstract overview of an example embodiment 200 of the web service process and the associated software hooks within an executing system. In general, FIG. 2A provides an abstract overview of how an embodiment of the present disclosure operates within a web service 203 process. As illustrated by arrow 212, the web service 203 receives HTTP traffic (i.e., web requests) and produces an internal representation of the HTTP traffic as a web request object 215. The security module 206 is resident in the web service 203 process and has installed software hooks (245, 248, 251, and 254) at various points associated with the web service's processing of the web request object 215. The software hooks 245, 248, 251, and 254 appear as black circles connected to the security module 206 by dashed lines, while arrow 218 illustrates the processing performed upon the web request object 215 prior to its transformation into a database query object 221. As illustrated, the web request object 215 and its associated information is input into the associated processing steps associated with the web service 203, and one or more database queries, represented by the database query object 221, are generated as the processing's output. Although the processing steps are illustrated as a single arrow 218, it will be understood to include the various operations and functionality associated with the processing of the web request object 215.

The database query object 221 is passed to a database client module 233, which then exchanges traffic (via arrows 257a and 257b) with a database service 236 and its database management system 239 in order to execute the underlying database query against a database 242 associated with the database service 236. In some instances, the database service 236 and the database 242 may be located on a single system, while in other instances, the two may be located on different systems, remote from one another. Similarly, the web service 203 and the database service 236 may be located on the same system in some instances, while in others, the two may be located remote from one another, using a network or other method of communication to interact. The database client module 233 may include one or more APIs that allow the web service 203 to exchange information with the database service 236 and to retrieve database information responsive to the database query generated after the web request object's 215 processing operations.

As illustrated in FIG. 2A, the security module's 206 software hooks are installed at one or more locations associated with the processing of the web request object 215, as well as a location just prior to the web service's 203 sending of the database query object 221 to the database client module 233. The software hooks 245, 248, 251, and 254 are used to store and retrieve data associated with the initial web request, allowing the information to be propagated throughout the web service 203. The software hooks 245, 248, 251, and 254 orchestrate the copying of the web request data (or references to that data) to various temporary storage locations (illustrated as boxes 224, 227, and 230). The first software hook (245) is present after the creation of the web request object 215. The information received from the web request, including any user-supplied information included therein, is stored (as illustrated by arrow 216*a*) in a first temporary storage location 224. The information stored by the first software hook 245 (here, in temporary storage location 224) is retrieved by the second software hook 248, which copies the information into a second temporary storage location 227 (as represented by arrow 216*b*). As processing of the web request object 215 continues, the third software hook 251 retrieves the information from the second temporary storage location 227 and stores a copy into a third temporary storage location 230 (as represented by arrow 216*c*). Arrows 216*a*, 216*b*, and 216*c* illustrate the duplication operations performed on the initial web request data as processing continues. Each temporary storage location 224, 227, and 230 is accessible by the corresponding software hook. Generally, the web request information is propagated when the processing of the web request requires handing off to (or processing by) a different process, thread, or machine, such that the previous temporary storage location is no longer readily available to the next software hook. By propagating the information throughout the processing operations, the initial web request information can be associated with the database query generated at the completion of the web request's processing. As illustrated, the final software hook 254, located just prior to the database query's execution, can access the third temporary storage location 230 (as shown by arrow 216*d*) to retrieve the information associated with the initial web request. The final, or terminal, software hook 254 can send the database query information and the initial web request information to the security module 206 for comparison and analysis (as described in the present disclosure). By correlating the database query with the causative web request (and the information included therein), a security analysis of the database query can be performed in light of the untrusted user input included with the web request that may have been used in the generation of the database query itself. If the database query is acceptable or deemed to be safe, the terminal software hook 254 may allow the database client module 233 to receive the generated database query, and allow the web service 203 to retrieve the appropriate information from the corresponding database 242 via the database service 236. Alternatively, the security module 206 may identify at least a portion of the database query as malicious. In doing so, the security module 206 can access a set of security rules 209 to determine how to proceed with the database query. In some instances, the security rules 209 may allow certain types of database queries to be executed. In other instances, the security rules 209 may identify one or more transformations to be made to the database query (in light of the initial user input) that can sanitize the potentially malicious portions of the database query, and use the sanitized database query to access the associated database 242. In still other instances, the security rules 209 may specify that potentially malicious database queries are not to be executed, wherein the security module 206 can provide an error message or throw an exception within the web service 203 such that the database query is not performed, thereby preventing any potentially malicious SQL injection from occurring.

Figure 2B:
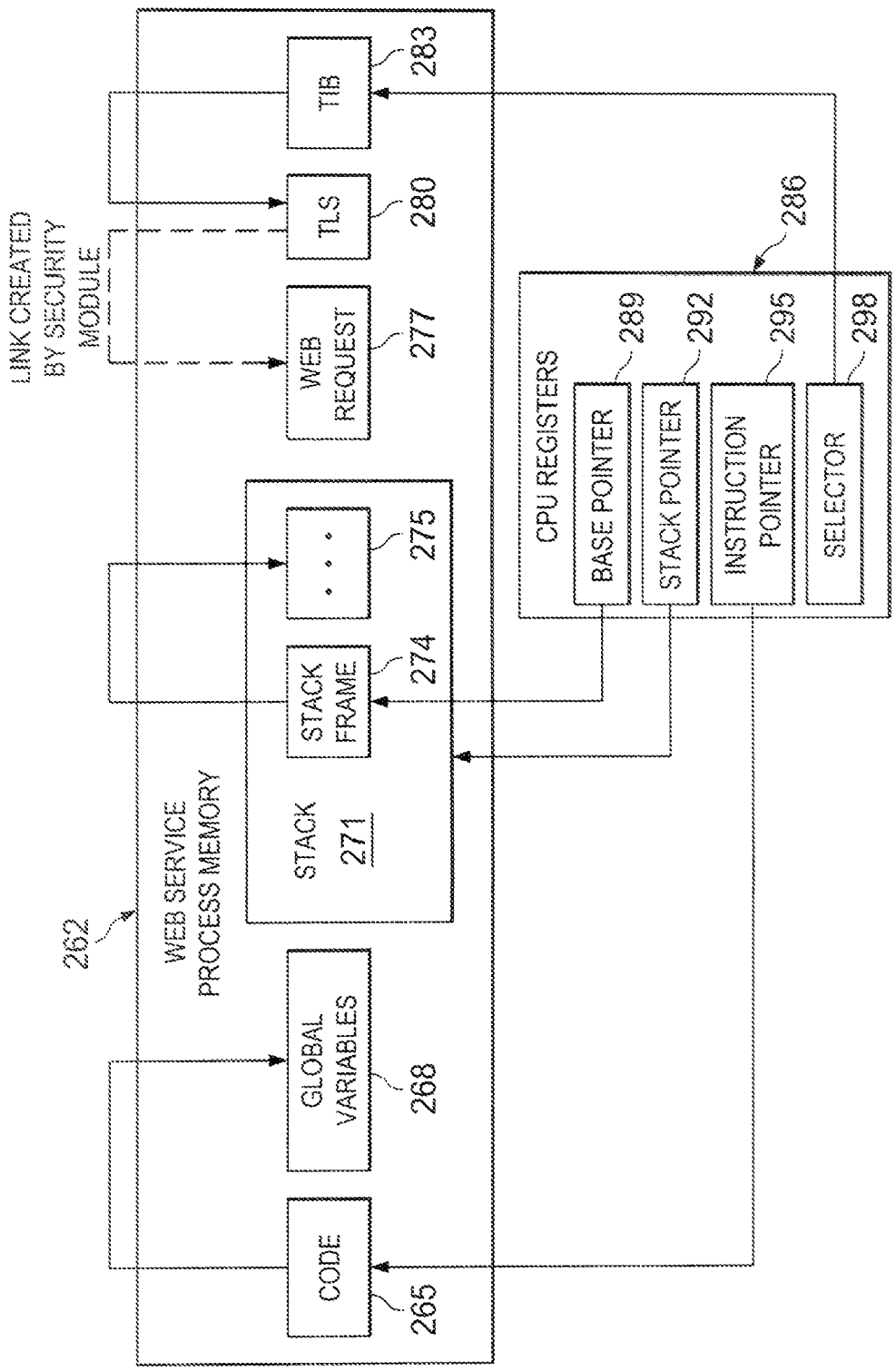
FIG. 2B is an example illustration of a web request object residing in a web service process's memory space, and various references by which the current execution context can provide access to the web request.

FIG. 2B is an example illustration of a web request object 277 residing in a web service process's memory space 262, and various references, or links, by which the current execution context can provide access to information associated with the web request object 277. In some instances, the current execution context of the web service can be tied to the state of the associated CPU, which is also partially depicted in FIG. 2B.

Four CPU registers 286 in the x86 Windows system architecture are illustrated: a stack pointer 292, a base pointer 289, an instruction pointer 295, and a selector 298. The stack pointer 292 points to the top, or numerically lowest address, of the current thread's private stack. In some instances, the base pointer 289 can point to the head of a linked list of stack frames 274, 275. The instruction pointer 295 points to the currently executing instructions, and the selector allows the current thread's private Thread Information Block (TIB) 283 to be meaningfully accessed using well-defined, relative offsets, regardless of the TIB's absolute address in memory. These four registers may be known by different names or titles in different architectures. For example, on x64 Windows architectures, these registers may be identified as RSP, RBP, RIP, and GS.

In order for a web request to be accessible at a given instant during web service execution, the web request 277 needs to exist in memory (or be available to the system). Thus, a connected chain of links from the CPU to the memory where the web request resides is needed. One possible link (not shown in FIG. 2B) to the web request 277 may exist in a global variable 268, which is itself linked to by a static address embedded in instructions that reference it, and which are in turn accessed via the instruction pointer 295. Another possible link (also not shown) to the web request 277 may exist in a link from a local variable or function argument in a stack frame 274 on the stack 271, which may in turn be referenced via a stack pointer 292 or base pointer 289 with relative memory access. A third link 276 exists, created by a particular embodiment of the present disclosure, to the web request 277 from the Thread Local Storage (TLS) 280, which is referenced by the Thread Information Block (TIB) 283, which, in turn, is accessible via a dedicated selector register 298.

One embodiment of the present disclosure can install software hooks (not shown) at specific points in the code 265 that, when reached, will create the proposed link in the current thread's private TLS 280 to point to the web request 277. It will be understood that such a software hook can be positioned so that it is reached while the current execution context contains some readily-available link to the web request 277; otherwise, the software hook would be unable to reliably locate it. In other words, the security module of the present disclosure is intended to intercept execution of a web service process when a link to the web request 277 is readily available, and thereafter propagate that link to future execution contexts associated with the web service process. The present disclosure's software hooks that intercept database queries can use the propagated link to the web request 277 in order to correlate each intercepted database query to the corresponding causative web request 277 in order to perform the described analysis on the database query prior to its execution. In some instances, additional links to the web request 277 may be provided. For example, a link to the web request 277 may be created by a link maintained in a global variable 268. The code 265 instituting the software hooks (not shown) could then contain the static address of the global variable 268 embedded in its instructions.

Figure 3:
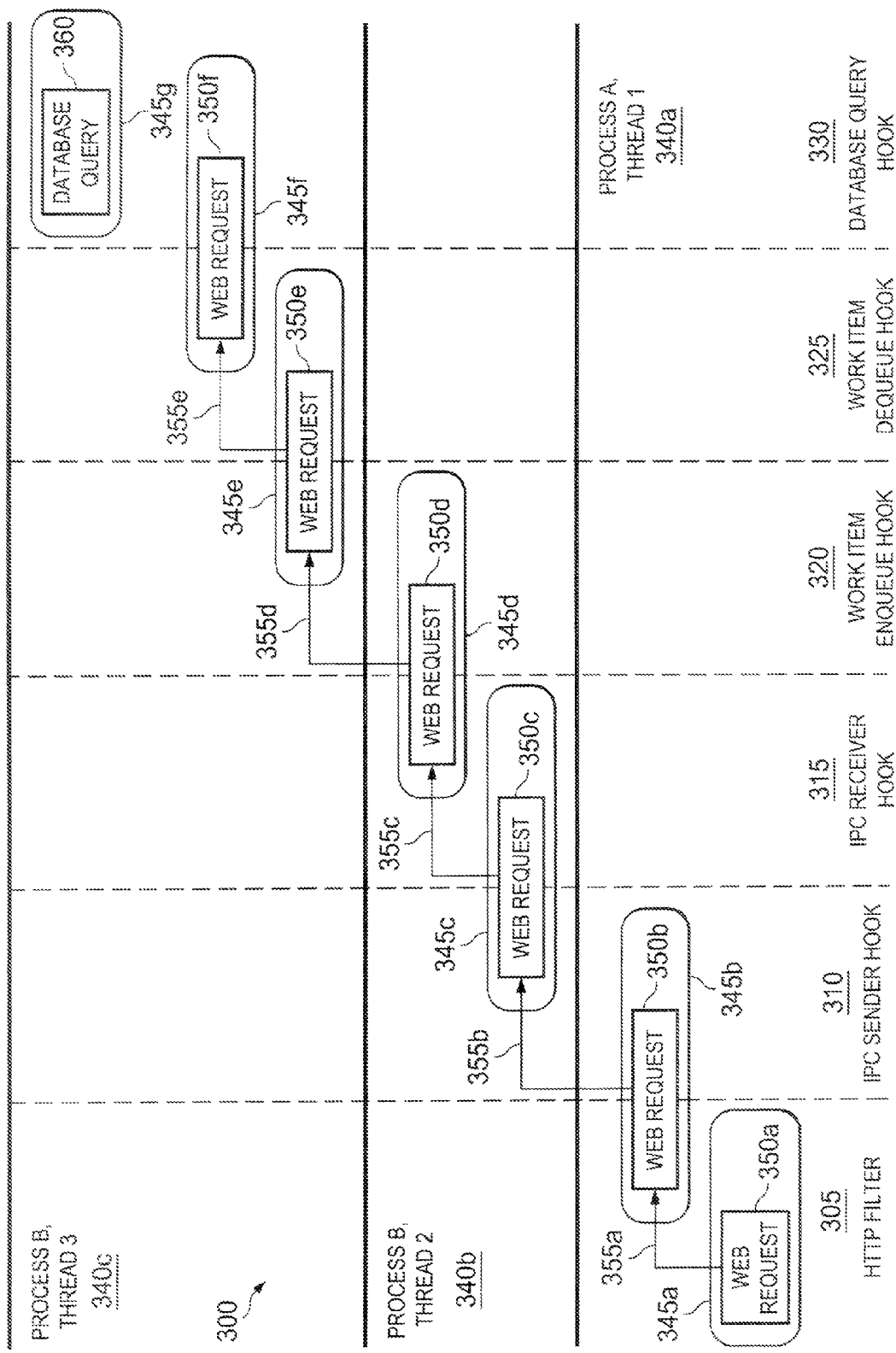
FIG. 3 is an example illustration of propagating a link to or a copy of a web request along a set of software hooks within a set of related web services processes, threads, and operations.

FIG. 3 is an example illustration 300 of propagating a link to or a copy of an original web request 350a along a set of software hooks within a set of related web services processes, threads, and operations. In the present illustration, the set of software hooks include the following: an HTTP filter hook 305, an inter-process communication (IPC) sender hook 310, an IPC receiver hook 315, a work item enqueue hook 320, a work item dequeue hook 325, and a database query hook 330. The security module, such as security module 132 described in FIG. 1, selects and establishes software hooks in these, and possibly more, locations associated with a web service. The deliberately selected software hooks of FIG. 3 are provided as an example and can be modified and installed in different locations, as appropriate, in other embodiments.

Each column is associated with a different software hook, and can each be understood to represent a particular execution context. Each column is labeled with the role of the software hook that is executing while the execution context is in effect (or in control of the thread and/or process). Elements 345a-g represent an area of storage (such as memory, or other suitable location) accessible in the execution context or contexts in which it lies, while the elements 350a-f (information associated with the web request) and 360 (the database query generated in response to the web request information) represent the data stored therein. Each arrow (355a-e) between different elements 345a-f represent the act of copying data or a reference thereto from one storage location to another. In some instances, the duplication of the data may transcend a thread and/or process boundary. When the duplication crosses a process boundary, shared storage or inter-process communication (such as a SOAP or other type of message or communication) may be employed. Rows within FIG. 3 demarcate storage available to one thread of a process, although storage associated with a particular thread (or, in some instances, with a particular process) is not always possible or available. Therefore, the illustrated rows of Process A, Thread 1 (340a), Process B, Thread 2 (340b), and Process B, Thread 3 (340c) will be understood to be general examples for illustrative purposes.

The application logic flow for a web server processing a particular web request is provided by the illustration of FIG. 3. Starting at the bottom left portion of the illustration, a web request is received by the web service (and associated web server). Processing proceeds through the web service's code toward the top right portion of FIG. 3. First, the web service (Process A) serializes and transmits the web request to a work process (Process B). In the example embodiment of FIG. 3, a pair of IPC hooks 310 and 315 is relied upon to follow the web request across the process boundary. Upon receipt, the work process (at Process B, Thread 2) deserializes the web request and performs the step of enqueuing the web request for processing by a worker thread (Process B, Thread 3). In order to maintain a link to the web request in the worker thread, another pair of the illustrated embodiment's software hooks 320 and 325 collaborate to track the web request from when it is enqueued to when it is dequeued by the worker thread (at Process B, Thread 3). At some point during processing, the worker thread issues a database query that is intercepted by the database query software hook 330. Because the work item dequeue software hook 325 placed a copy of (or a link to) the web request in a readily-available storage location, the database query software hook 330 is able to retrieve the web request (or information associated with the web request) and correlate at least a portion of the web request with the intercepted database query. The security module and its analysis module, or any other suitable component associated with the illustrated embodiment, can analyze the database query and compare it with at least a portion of the correlated web request to determine how to process the intercepted database query prior to execution of the query itself.

Figure 4:
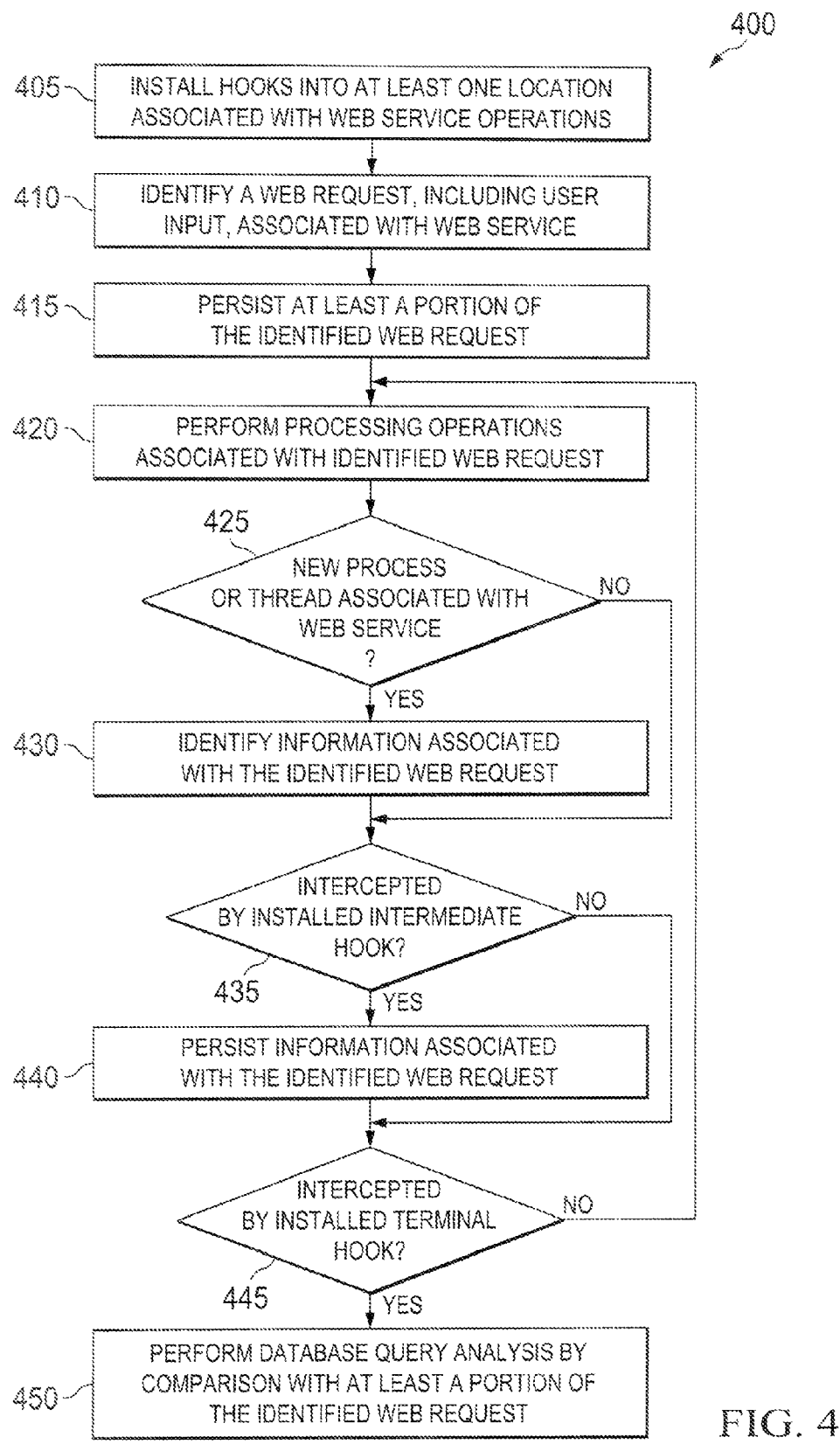
FIG. 4 is a flowchart of an example method for propagating web request-related information through the operations associated with a web service and determining if one or more installed software hooks are triggered by the operations.

FIG. 4 is a flowchart of an example method 400 for propagating web request-related information through the operations associated with a web service and determining if one or more installed software hooks are triggered by and/or associated with the operations. For clarity of presentation, the description that follows generally describes method 400 in the context of environment 100 illustrated in FIG. 1 from the perspective of the web server 120 associated with the web service 129. However, it will be understood that method 400 may be performed, for example, by any other suitable system, environment, or combination of systems and environments, as appropriate.

At 405, software hooks are installed in at least one location associated with the operations of a web service. As described in association with FIG. 2A, the software hooks may be installed in a plurality of locations such that the execution contexts associated with the processing of a received web request can propagate, or have access to, the information included within the web request initiating the operations of the web service. Different types of software hooks may be installed. In some instances, software hooks may be installed at predetermined locations within or associated with the web service or web server (such as one or more known DLLs or other files/processes). In other instances, software hooks may be dynamically installed throughout the processes and threads associated with a particular web service. A security module (such as the security module 132 of FIG. 1 or the security module 206 of FIG. 2) may determine the locations at which the software hooks are to be installed. In some instances, installing a software hook at a first predetermined location may result in additional software hooks being installed in one or more additional, dynamically determined locations, such as one or more processes initiated by a component at the first predetermined location. In some instances, a particular installed software hook may have a lifetime corresponding and equal to the lifetime of the process with which it is installed or instantiated. For example, if a worker process in which a hook has been installed is terminated or recycled by a master process, the software hook will be terminated as well. In other instances, one or more software hooks may be terminated or replaced after a predetermined period of time.

At 410, a web request associated with the web service is identified. The web request can include user input defined by a user, such as through a form or table input provided at a client or client device associated with the web server. The web request may be an HTTP request. The web request can include a uniform resource identifier (URI) and a host name defining the web service to be accessed and associated with the web request. The URI and the host name can be used by the web server to determine the physical path and file name to access as associated with the web request. In addition, the web request can include one or more variables (or other information) defined by the user or client who submitted the web request. An example of user input may include a user name and a password combination for logging in to a website. The web server may also identify a set of server variables associated with the identified web request, including information not explicitly defined in the web request, such as the client's IP address and TCP port, whether or not Secured Sockets Layer (SSL) or Transport Layer Security (TLS) was used with the request, and other web request relevant information. Provided the value of the server variables of the URI and host name, a string that uniquely identifies the file (and/or web service) being accessed can be constructed.

At 415, at least a portion of the web request is persisted. In some instances, the portions of the web request representing any user input may be persisted. Persistence may include storage in volatile or non-volatile memory, either locally at the web server or external thereto. Additionally, portions of the web request may be persisted by appending the information from the web request in a temporary message that is to be sent between processes within or external to the web server, such as SOAP-based messages.

At 420, processing operations associated with the identified web request (and associated with web service or web application invoked by the web request) are performed. The appropriate web service associated with the identified web request can determine the variables and information associated with the web request and the appropriate operations to perform.

At 425, a determination is made as to whether the processing operations associated with the web service require a new process's, thread's, or machine's operations to continue. In other words, a determination is made as to whether the web service's operations require a new execution context in which the information associated with the original web request is not otherwise readily available. If a new process, thread, or machine is required, method 400 continues at 430, where information associated with the identified web request is identified. In some instances, identifying information associated with the identified web request at 430 can include propagating at least a portion of the identified web request information across a process, thread, and/or machine boundary. Example methods for propagating information across those boundaries are described throughout the present application. In some instances, the determination at 425 may also include a determination as to whether inter-thread boundaries are crossed during execution of the web service, and if so, move method 400 to 430. After 430 is complete, method 400 continues at 435. Returning to the determination of 425, if no new process, thread, or machine's operations are required by the operations (or if the information associated with the original web request is otherwise available), method 400 moves immediately to 435.

At 435, a determination is made as to whether the operations associated with the web service are intercepted by an intermediate software hook installed as a result of the software hook installation of 405. If an intermediate software hook intercepts the web service operations, the information associated with the identified web request is persisted at 440. Persisting the web request information may include, for example, storing at least a portion of the web request in a temporary storage location, a permanent or otherwise non-temporary storage location, or appending at least a portion of web request to a message sent between components of the web service, web server, and/or security module, as well as other locations/components both internal and external to the web server. The operations of 440 can allow the information associated with the original web request to be propagated across processes, threads, and machines, if necessary, as well as make the information available for comparison's sake if a database query is generated by the web service's processing operations. Once the information is persisted, method 400 continues at 445. Returning to 435, if it is determined that an intermediate software hook has not intercepted the processing operations of the web service, then method 400 moves directly to 445.

At 445, a determination is made as to whether the operations associated with the web service are intercepted by a terminal software hook installed as a result of the software hook installation of 405. A terminal software hook may represent a software hook associated with a generated database query. In some instances, the terminal software hook may be a software hook installed into (or just prior to providing a database query to) a database query API. The terminal software hook can intercept the database query, access the latest persisted information associated with the original web request (including at least the user input associated with the web request, if any), and use that information to compare the web request to the database query in order to determine if the database query possibly comprises any malicious SQL code. In some instances, the terminal software hook may provide the intercepted database query (and, in some instances, the web request information) to a security or analysis module to perform any further analysis. If it is determined that the processing operations are not intercepted by a terminal hook, method 400 returns to 420, where further processing operations associated with the web service and used to further process the web request are performed. If, however, the processing operations are intercepted by a terminal hook, method 400 continues at 450.

Figure 5:
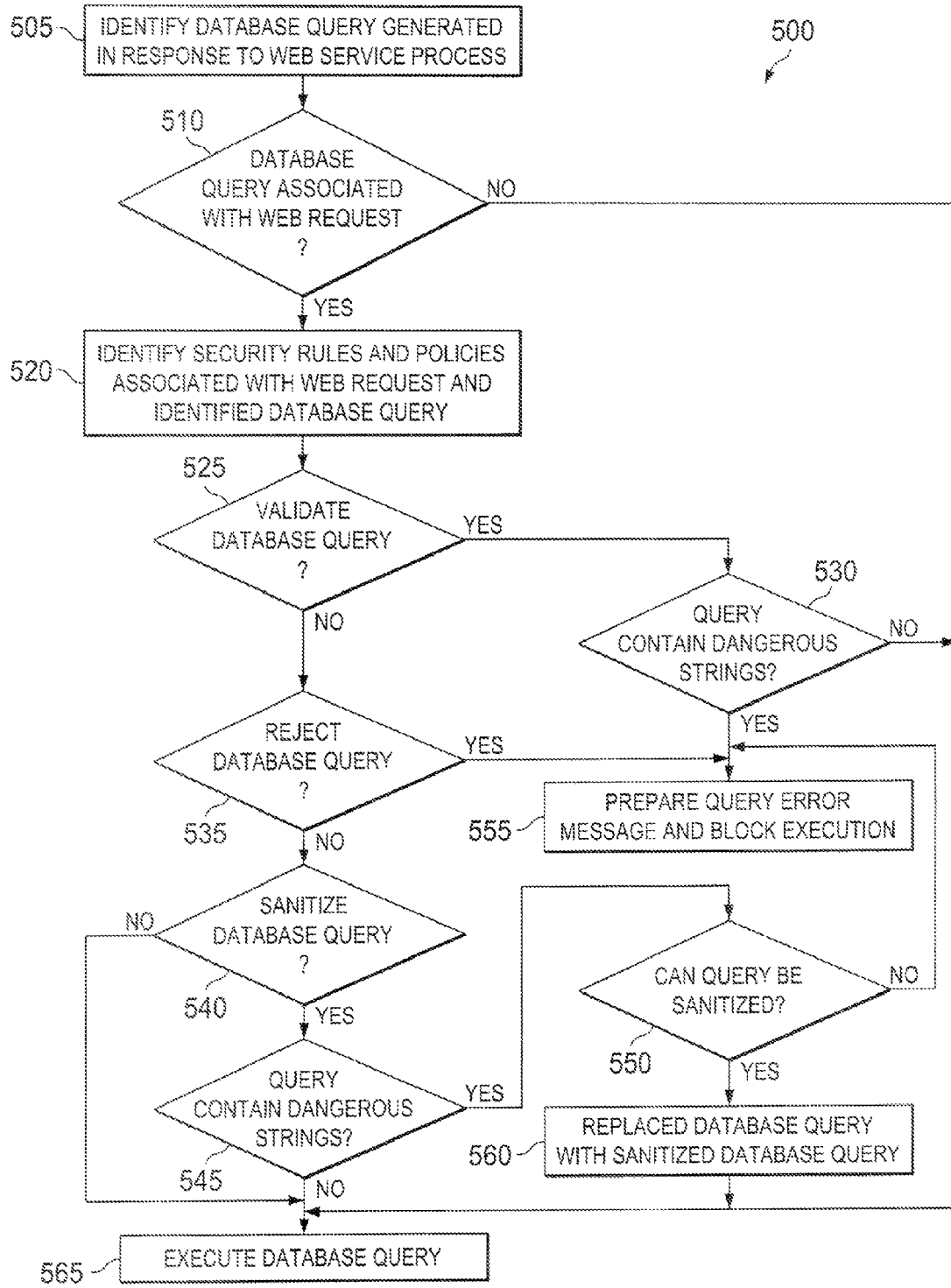
FIG. 5 is a flowchart of an example method for analyzing and, in some instances, modifying, a database query generated in response to an original web service request.

At 450, a database query analysis is performed by comparing at least a portion of the original web request with the generated database query. In some instances, the comparison (or analysis) performed may be based on a security rule set. The security rule set may a single rule set for all analyses, or a plurality of rule sets may be available. In some instances, the rule set to be used may be selected based on one or more criteria, including the particular web service associated with the web request, information associated with the user or entity that submitted the web request, information included within or associated with the web request itself (such as a source IP address), configuration by an administrator or developer (e.g., disabling of one rule set and enabling of another, or otherwise changing the default action), as well as any other suitable criteria. Once the rule set is determined, the comparison and/or analysis may be performed between the database query and at least a portion of the web request. FIG. 5 illustrates example operations associated with the comparison and analysis of the database query in light of the web request information.

FIG. 5 is a flowchart of an example method 500 for analyzing and, in some instances, modifying, a database query generated in response to an original web service request. For clarity of presentation, the description that follows generally describes method 500 in the context of environment 100 illustrated in FIG. 1 from the perspective of the web server 120 associated with the web service 129. However, it will be understood that method 500 may be performed, for example, by any other suitable system, environment, or combination of systems and environments, as appropriate.

At 505, a database query generated in response to the processes of a web service is identified. In some instances, the database query is identified by a software hook associated with a database query API or client, such that when a database query is generated, the software hook can intercept and identify it. At 510, a determination is made as to whether the identified (or intercepted) database query is associated with a web request. In some instances, the determination can be compared against a set of web requests stored and available to the database query software hook in a temporary storage location. If the database query is associated with one of the web requests, method 500 continues at 520. If the database query is not associated with a web request (or a web request available to the database query software hook), method 500 skips to 565, where the database query can be executed or otherwise allowed to proceed.

At 520, a set of security rules and policies associated with the corresponding web service and the identified database query is identified. In some instances, identifying the appropriate set of security rules and policies associated with the web service and database query may be based, at least in part, on the associated web request. For example, a URI and a host name from the web request, and in some instances, one or more server variables not explicitly included in the web request, may be used to generate a string value uniquely identifying the file being accessed. The file being accessed may be associated with a particular set of security rules and policies defining how different types of web requests and database queries are handled. In some instances, portions of user input associated with the web request may also be used in the determination of the appropriate security rules and policies. The appropriate security rules and policies can, in some instances, be tied to the target of the web request. A particular web server may be associated with more than one web service. Using the identity of the web service, plus the host name and URI from the web request, a unique identifier used to determine the appropriate rule set can be created. A security rules and policy store may include a set of files defining the rules and policies associated with particular web services (and variations thereof). The correct file defining the security rules and policies associated with the original web request associated with the database query can be retrieved and implemented for further comparisons and processing. In one embodiment, security rules can be defined in an XML document available to the security module, where the XML document is arranged in a hierarchy that can parallel the directory tree of the website or associated web service. In that embodiment, rules can be accessed by the full path and file name of the file (i.e., the web page, web service, or script) that the user requested.

The additional operations illustrated in FIG. 5 describe four possible actions: (1) Accept, which passes on the database query without modification (i.e., to the database client or API); (2) Sanitize, which modifies potentially dangerous portions of the database query that were apparently derived from web request strings in order to make the database query safe; (3) Validate, which blocks the database query (as opposed to modifying it) if it contains potentially dangerous portions apparently based on the original web request; and (4) Reject, which blocks the database query. The identified security rules and policies can determine the appropriate actions and operations to perform when a database query is intercepted. In some instances, the identified security rules and policies can also determine how the database query and original web request (or portions thereof) are compared, as well as the potential transformations of the web request and database query to consider and perform, such as whether different variations of one or each should be considered. In some instances, the additional operations (described below) are performed by an inspection and comparison of the database query and the original web request (or at least a portion thereof) based on the security rules and policies defined in the identified set of security rules and policies. Those rules can, in some instances, be provided to a rules processor component, which can also receive the intercepted database query and the corresponding original web request. The comparisons performed by the rules processor can include regular expression pattern matching on the database query and any field of the web request, as well as other operations, as appropriate. The highest priority matching rule's action is taken based on the set of security rules and processes, or, if no rule matches, a default rule. In some instances, the default rule may be Validate. In other words, database queries that are determined to be safe are allowed to execute, while database queries with possibly malicious content are not.

At 525, a determination is made as to whether the database query is to be validated. If the database query is to be validated, method 500 continues at 530, where a determination is made as to whether the database query contains dangerous strings. If the determination at 530 is that no dangerous strings are included in the database query, then method 500 moves to 565, where the database query is allowed to be executed. If, however, dangerous strings are identified at 530, method 500 continues at 555, and the database query is blocked. In some instances, such as that described in FIG. 5, a database query error message is prepared for presentation to the user or client associated with the web request, thus notifying the user or client that the database query could not be validated and will not be executed. Returning to 525, if it is determined that the database query is not to be validated, method 500 continues to 535. At 535, a determination is made as to whether the database query is to be rejected. In some instances, this determination is based on the database query itself, such as when all database queries to a particular database are to be stopped or suspended. Security rules and policies may also determine rejection. For example, an administrator or developer may implement a rule that rejects any database query that is excessively long or that contains a particular string, such as "xp_cmdshell". Conversely, an administrator or developer may implement rules to allow, sanitize, or validate a database query that meets specific criteria, and then configure the default rule to reject all other database queries. If the database query is not to be rejected, method 500 continues at 540.

At 540, a determination is made as to whether the security rules and policies allow for the database query to be sanitized (where appropriate and possible). If the determination at 540 is that the database query is not to be sanitized, method 500 moves to 565 and allows the database query to be executed. If neither validation, rejection, or sanitization is performed in method 500, it may be considered that the database query will be allowed to execute. If, instead, a determination is made that the database query is to be sanitized, then method 500 continues at 545. At 545, a determination is made as to whether the database query includes dangerous strings or string content. If no dangerous strings or string content is detected, method 500 continues at 565, and the database query is allowed to execute. If, however, dangerous strings are detected in the determination of 545, method 500 moves to 550.

At 550, a determination is made as to whether the database query can be sanitized. The determination of whether the database query can be sanitized may be based on the security rules and policies identified at 520. The determination as to whether a particular database query can be sanitized is a query-by-query analysis. In one example, each database query may be examined, character-by-character, by the rules processor component (or another suitable component or system). The rules processor component is programmed (or provided) with an understanding of general character-level SQL syntax. In some instances, the type of database associated with the database query may also be identified. In some instances, the rules processor may identify the database type prior to beginning its processing of the database query in order to assure that variations between databases and SQL commands associated with different types of databases are accounted for. In some instances, the type of database may be dynamically determined by accessing the target database (or system) associated with the database query. In some instances, the security rules and policies may change based on the particular type of database associated with the database query. For example, at least some of the analysis of the SQL associated with the database query may change based on the determined type of database. The rules processor can perform basic identification of tokens within the database query, such as string literals, name strings, and keywords including FROM, INTO, LIKE, and WHERE. Based on the identified tokens, one or more assumptions as to what character or characters should delimit any string that follows those items may be known. At the beginning of each token, the rules processor can compare the portion of the database query beginning there to each string included within the original web request. Both the set of raw strings from the web request and a set of common or selected sets of transformations on each string of the web request (e.g., uppercase/lowercase conversion, HTML escaping and unescaping, URL encoding and decoding, as well as other transformations) can be used to compare to the portions of the database query. If the web request string (or a transformation thereof) matches the portion of the intercepted database query, and if the string contains a character that would modify the syntax of the database query, then the database query can be sanitized. Restated, the portion of the web request string that would modify the syntax of the database query can be modified to provide database query content without the modified syntax. Web request information that may modify the syntax of the database query may include, for example, a string literal wrapped in single quotes containing an unescaped single quote from the web request, thus causing modifications to the database query that may be associated with malicious code. An example of when a dangerous database query cannot be sanitized, and therefore must be rejected, is if multiple, overlapping portions of the database query appear or are determined to be derived from the web request strings. In that case, there may not be a well-defined order or process for safely performing sanitization, making the safest option a rejection of the database query.

If the database query is capable of being sanitized, then method 500 continues at 560, where the identified database query is replaced with a sanitized version of the database query (i.e., with any potential malicious code removed or modified). Once the sanitized version of the database query is created, the sanitized database query can be executed at 565. In some instances, the sanitized database query is used temporarily. For example, in a .NET environment, the database query may be stored as a command object's CommandText property. When performing a sanitized copy of the database query, a copy of the original database query is created, a sanitized version of the original query is assigned to the CommandText property, the sanitized query is performed, and, finally, the original query string is restored to the CommandText property. By making the replacement temporary (and performed by the security module and/or the software hook associated with the security module), sanitization can be made transparent to the web service. If, however, the database query is not capable of being sanitized, method 500 continues at 555, where a database query error message is prepared for presentation to the associated user or client, and the execution of the unsanitized database query is blocked.

FIG. 6A is a flowchart of an example method 600 for intercepting, via a software hook, an incoming web service request associated with an ASP script, in an example embodiment of the present disclosure. Specifically, the method 600 of FIG. 6A represents the logic of an example software hook intercepting web requests. At 604, the software hook intercepts the web request. At 608, a determination is made as to whether the web request will cause the execution of an ASP script. If an ASP script will be executed based on the web request, method 600 moves to 612, where the software hook copies the web request's data strings and metadata (sometimes referred to as the server variables, although additional or different information, as well as a subset of that information, may also refer to server variables) into a data structure referenced in Thread Local Storage (TLS). Once the information associated with the web request is stored, method 600 continues onto 616, where regular processing of the web request by the associated web service is performed. If, however, it is determined at 608 that no ASP script will be executed based on the web request, then method 600 continues at 616.

Figure 6C:
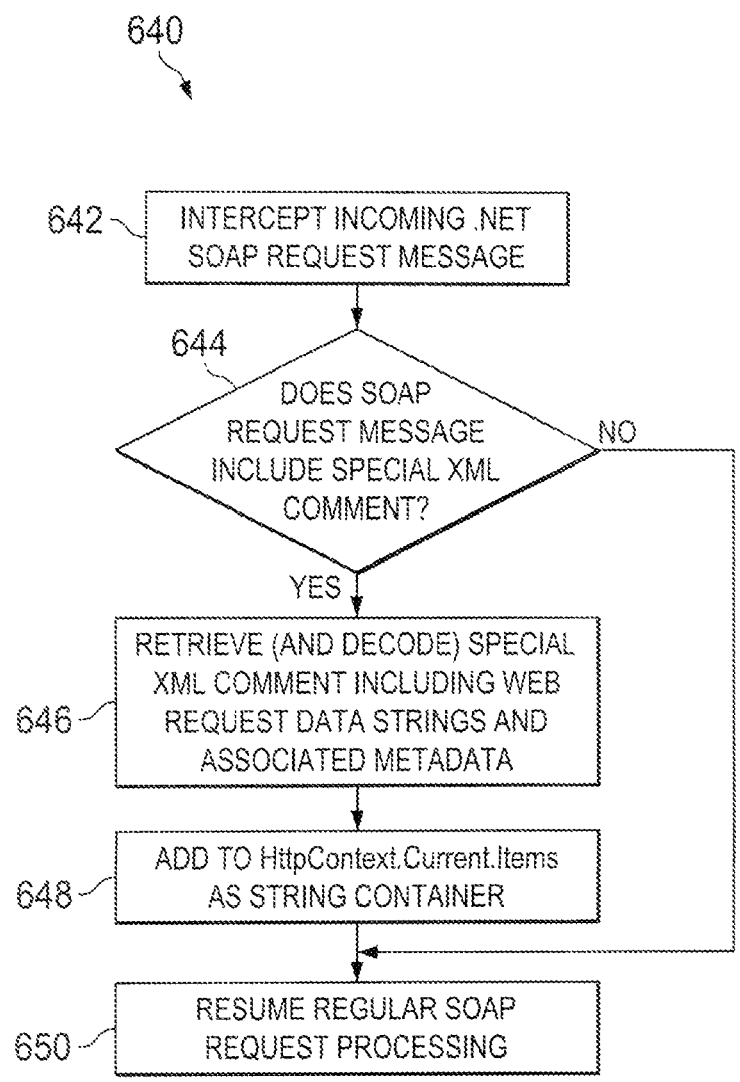
FIG. 6C is a flowchart of an example method for intercepting and storing, via a software hook, information associated with an incoming message associated with the operations of a web service associated with an ASP.NET script, in an example embodiment of the present disclosure.

FIGS. 6B and 6C illustrate processes associated with example ASP.NET-based embodiments of the materials disclosed in the present application. For ASP.NET pages, the Microsoft .NET Framework facilitates access to the web request during certain early phases of processing via System.Web.HttpContext.Current.Request, and the embodiments of ASP.NET script protection make use of this mechanism in the installed software hooks, where available. The example flowcharts of FIGS. 6B and 6C pertain only to ASP.NET scripts. Each flowchart relates to a different aspect of a particular embodiment's SOAP extension, which is used like a filter for SOAP-format messages transmitted or received while performing .NET Web Services transactions. In the illustrated examples, one instance of the SOAP extension executes on the client side, while a separate instance of the same SOAP extension executes on the server side. The server may reside in a separate .NET application domain, in another process, or on a different machine from the client. Therefore, in order to bridge the client and server execution contexts, the illustrated embodiment's SOAP extension must first identify whether it is executing on the client side or the server side, and prepare to transmit data or to receive data from the other instance accordingly. For the purposes of the present embodiment, the inter-instance communication is performed by appending information to the SOAP message, although other implementations could use separate channels, mediums, or methods for inter-instance communications.

Turning to FIG. 6B, an illustration of process or method 620 associated with the .NET SOAP extension on the client side is provided. At 624, an outgoing .NET SOAP request is intercepted just prior to transmission to the server side. At 626, a determination is made as to whether System.Web.HttpContext.Current.Items, which can be considered the illustrated embodiment's web request local storage, contains a string container created by the software hook associated the security module. If a string container does not already exist, method 620 continues at 628, where a string container is created at 630 from the strings of the web request located within HttpContext.Current.Request (the information for which is retrieved at 628). Whether the string container already exists (as determined at 626), or if a new string container is created (at 630), at 632 the string container is encoded and appended to the outgoing SOAP message in a manner allowing the encoded string container to be retrieved by the server-side instance of the embodiment's SOAP extension without interfering with deserialization. The encoded string container can be a serialized representation of the strings of the web request that is encoded in such a way as to be suitable for transmission as an appendage of or to a SOAP message. Appending information to a SOAP message may include adding and/or inserting information into any portion of the SOAP message, such as at the beginning of the message, at the end of the message, or at any suitable location therein. At 634, regular SOAP request processing is resumed (i.e., the software hook returns control to the normal operations), and the updated SOAP message is sent to the server.

FIG. 6C provides an illustration of method 640 illustrating the operations of the embodiment's SOAP extension software hook on the server, and begins upon receipt of a SOAP message by the server from the client, prior to deserialization of the message. At 642, the incoming .NET SOAP request message is intercepted by the software hook. At 644, a determination is made as to whether the intercepted SOAP request message includes a special XML comment (i.e., the encoded and appended string container, as described in FIG. 6B). The determination may involve searching the raw XML body of the SOAP message for the special XML comment. If a string container is found, method 640 continues at 646, where the string container is retrieved or extracted from the SOAP message (and decoded, if necessary). At 648, a copy of the retrieved contents of the string container, or a reference thereto, is then added to or stored in HttpContext.Current.Items. Once the contents of the string container is added/stored, or if no string container is identified at 644, method 640 continues at 650, where regular SOAP request message processing continues.

For the server-side SOAP extension instance, and for all application logic that proceeds from the SOAP server's receipt of a SOAP message, the contents of HttpContext.Current.Request will generally be useless. HttpContext.Current.Request may reference a web request—however, it is generally an internal request that was used in the transmission of the SOAP request message, and not the original web request containing user input and data that will be used in the construction and subsequent analysis of the database query associated with the web service. Without the transmission of the string container, most or all of the original web request's information would be inaccessible to the server side.

Figure 6D:
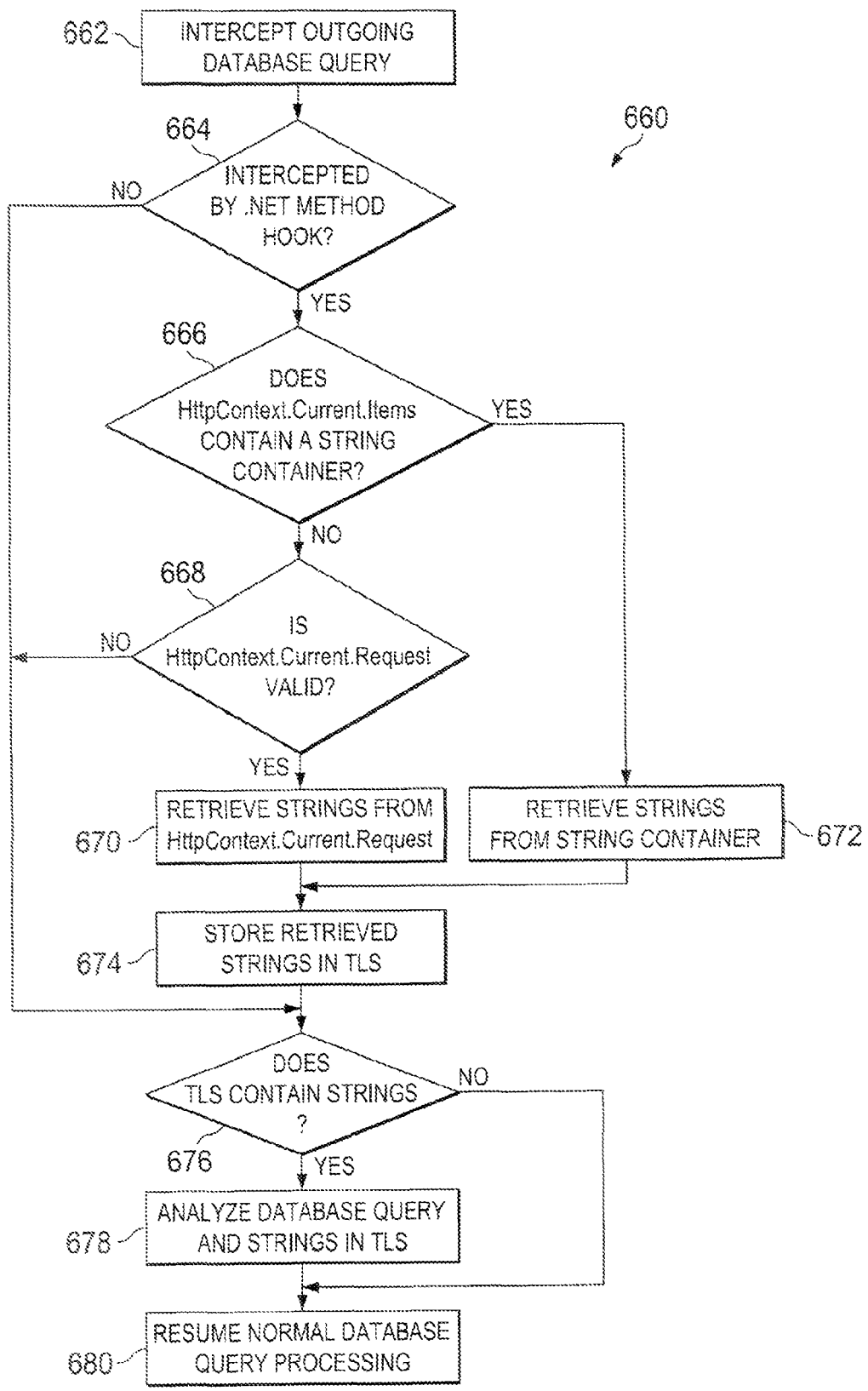
FIG. 6D is a flowchart of an example method for determining if a database query intercepted by a software hook within an example embodiment of the present disclosure was issued during processing of a web request and, if so, for identifying information associated with the correlated web request and performing additional analysis on the database query.

FIG. 6D is a flowchart of an example method 660 for determining if a database query intercepted by a software hook within an example embodiment of the present disclosure was issued during processing of a web request, and if so, for identifying information associated with the correlated web request and performing additional analysis on the database query. At 662, an outgoing database query (such as a database query being sent to a database client or API) is intercepted by a software hook. The software hook determines if the intercepted database query was issued during processing of a web request, and if so, the software hook gathers the information and strings of interest associated with the corresponding web request, passing these strings to the security module (or its analysis module or other appropriate component) for a comparison of the web request with the database query. The illustrated method 660 is functional for both ASP-based and ASP.NET-based embodiments (of FIGS. 6A and 6B-C, respectively). Method 660 addresses operations associated with both types of software hooks described in the previous figures. In some instances, method 660 can be split into two or more separate methods associated with each type of software hook.

At 664, a determination is made as to whether the outgoing database query is intercepted by an ASP.NET-associated hook. If the software hook is not associated with ASP.NET, then it is considered of the ASP software hook class, and method 660 continues at 676, where a determination is made as to whether the Thread Local Storage (TLS) contains strings associated with the web request (see FIG. 6A for related operations associated with ASP-based solution). If, however, the determination at 664 determines that the software hook is associated with an ASP.NET hook, then method 660 continues at 666. At 666, a determination is made as to whether a string container is contained in the HttpContext.Current.Items property. If a string container is contained in the HttpContext.Current.Items property, then method 660 continues at 672, where the strings from or associated with the string container are retrieved, and to 674, where the retrieved strings are stored in the TLS. If, however, the HttpContext.Current.Items property does not include a string container, then method 660 continues at 668 where a determination is made as to whether the information in HttpContext.Current.Request is valid. As described above, HttpContext.Current.Request may not be valid (or include information associated with an underlying web request) when SOAP requests have been sent across process, thread, or machine boundaries. If HttpContext.Current.Request is invalid, then method 668 continues at 676. If, however, HttpContext.Current.Request is valid, then method 660 retrieves the valid strings associated with the original web request from HttpContext.Current.Request at 670. Once those strings are retrieved, method 660 continues at 674, where the retrieved strings are stored in the TLS.

Returning to the determination at 676, if neither the ASP-based embodiment nor the ASP.NET-based embodiment provide data structures of strings at this point, then the database query can be determined not to have been caused by a web request, or an error or unexpected state was encountered. In those instances, method 660 turns to a fail-safe, and allows the database query to issue without further inspection. However, if a data structure and/or information associated with the original web request is available, then at 678 an analysis of the database query in light of the web request is performed. In some instances, the analysis of 678 may be some or all of the operations illustrated in FIG. 5. Once the analysis is completed, the appropriate response is provided, and method 660 resumes normal database query processing at 680 (unless the database query is rejected or sanitized as described in FIG. 5).

The preceding figures and accompanying descriptions illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different orders than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. For example, although embodiments have been primarily described within an ASP or ASP.NET environment, any suitable environment, including a PHP-powered application or web service, can be used. Accordingly, the above description of example embodiments does not define or constrain this disclosure. Other changes, substitutions, and alterations are also possible without departing from the spirit and scope of this disclosure.

What is claimed is:

1. A computer implemented method performed by one or more processors for preventing SQL injection attacks, the method comprising the following operations:

intercepting, at a first software hook, a web request associated with a web service, the first software hook associated with a first execution context of the web service;

persisting at least a portion of the intercepted web request in a storage location associated with the first software hook, wherein the portion of the intercepted web request persisted in the storage location is made accessible to at least one additional execution context associated with the web service and the at least a portion of the intercepted web request is appended to one or more messages transmitted between one or more execution contexts, the intercepted web request comprising at least one string;

intercepting a database query generated by at least one web service processing operation at a second software hook, the second software hook associated with execution of the generated database query, wherein the database query is generated in response to the intercepted web request, and wherein the second software hook retrieves the persisted portion of the intercepted web request;

comparing at least a portion of the persisted portion of the intercepted web request with at least a portion of the intercepted database query by tokenizing the intercepted database query and comparing portions of the intercepted database query corresponding to each token to each string captured in the intercepted web request; and determining, prior to the intercepted database query being executed, whether the intercepted database query corresponds to a potential SQL injection attack if a string of the intercepted web request matches a portion of the intercepted database query and such string comprises a character that modifies a syntax of the intercepted database query.

2. The method of claim 1 further comprising the following operations:

preventing the execution of the intercepted database query if the intercepted database query is determined to correspond to a potential SQL injection attack.

3. The method of claim 1 further comprising the following operations:

allowing the execution of the intercepted database query if the intercepted database query is determined not to correspond to a potential SQL injection attack.

4. The method of claim 1, wherein intercepting the web request at the first software hook includes at least one of modifying or diverting the web request from the first execution context of the web service.

5. The method of claim 1, wherein persisting at least a portion of the intercepted web request in the storage location associated with the first software hook includes storing at least a portion of the intercepted web request in memory.

6. The method of claim 1, wherein the first execution context and the second execution context are distinct processes associated with the web service, and further wherein the first execution context and the second execution context do not share a memory address space.

7. The method of claim 1, wherein the first software hook comprises a detour software hook.

8. The method of claim 1 further comprising the following operations: prior to intercepting the web request:

identifying a set of predefined locations within the web service for installation of software hooks; and installing software hooks at each of the set of predefined locations, where each software hook is associated with a security application.

9. The method of claim 8, wherein installing software hooks at each of the set of predefined locations further includes:

dynamically identifying an additional location associated with at least one of the set of predefined locations, where the additional location is dynamically identified when a new process associated with the predefined location is initiated.

10. The method of claim 8, wherein the set of predefined locations includes at least one known dynamic linked library (DLL).

11. The method of claim 8, where at least one of the set of predefined locations corresponds to a location on an execution path for the web service associated with executing database queries.

12. An article comprising a non-transitory, machine-readable storage device storing instructions operable to cause at least one processor to perform operations comprising: intercepting, at a first software hook, a web request associated with a web service, the first software hook associated with a first execution context of the web service;

persisting at least a portion of the intercepted web request in a storage location associated with the first software hook, wherein the portion of the intercepted web request persisted in the storage location is made accessible to at least one additional execution context associated with the web service and the at least a portion of the intercepted web request is appended to one or more messages transmitted between one or more execution contexts, the intercepted web request comprising at least one string;

intercepting a database query generated by at least one web service processing operation at a second software hook, the second software hook associated with execution of the generated database query, wherein the database query is generated in response to the intercepted web request, and wherein the second software hook retrieves the persisted portion of the intercepted web request;

comparing at least a portion of the persisted portion of the intercepted web request with at least a portion of the intercepted database query by tokenizing the intercepted database query and comparing portions of the intercepted database query corresponding to each token to each string captured in the intercepted web request; and determining, prior to the intercepted database query being executed, whether the intercepted database query corresponds to a potential SQL injection attack if a string of the intercepted web request matches a portion of the intercepted database query and such string comprises a character that modifies a syntax of the intercepted database query.

13. The article of claim 12, the operations further comprising:

preventing the execution of the intercepted database query if the intercepted database query is determined to correspond to a potential SQL injection attack.

14. The article of claim 12, the operations further comprising:

allowing the execution of the intercepted database query if the intercepted database query is determined not to correspond to a potential SQL injection attack.

15. The article of claim 12, wherein intercepting the web request at the first software hook includes reading a set of information associated with the web request from the first execution context of the web service.

16. The article of claim 12, wherein persisting at least a portion of the intercepted web request in the storage location associated with the first software hook includes storing at least a portion of the intercepted web request in memory.

17. The article of claim 12, wherein the first execution context and the second execution context are distinct processes associated with the web service, and further wherein the first execution context and the second execution context do not share a memory address space.

18. The article of claim 12, wherein the first software hook comprises a detour software hook.

19. The article of claim 12, the operations further comprising:
   prior to intercepting the web request:
      identifying a set of predefined locations within the web service for installation of software hooks; and
      installing software hooks at each of the set of predefined locations, where each software hook is associated with a security application.

20. The article of claim 19, wherein installing software hooks at each of the set of predefined locations further includes:
   dynamically identifying an additional location associated with at least one of the set of predefined locations, where the additional location is dynamically identified when a new process associated with the predefined location is initiated.

21. The article of claim 19, wherein the set of predefined locations includes at least one known dynamic linked library (DLL).

22. The article of claim 19, where at least one of the set of predefined locations corresponds to a location on an execution path for the web service associated with executing database queries.

23. A system comprising:
   a web server including:
      at least one processor adapted to execute at least one web service operable to interact with at least one database, and
      at least one memory device served by the web server, the memory device storing instructions associated with at least one web service; and
   a security software module, integrated with the web server and a first web service and adapted to:
      identify a set of predefined locations within the first web service for installation of a set of software hooks;
      install the set of software hooks at each of the set of predefined locations;
      intercept, at a first software hook from the set of software hooks, a web request associated with the first web service, the first software hook associated with a first execution context of the first web service, wherein the at least a portion of the intercepted web request is appended to one or more messages transmitted between one or more execution contexts, the intercepted web request comprising at least one string;
      persist at least a portion of the intercepted web request in a storage location associated with the first software hook, wherein the portion of the intercepted web request persisted in the storage location is made accessible to at least one additional execution context associated with the first web service;
      intercept a database query generated by at least one web service processing operation at a second software hook, the second software hook associated with execution of the generated database query, wherein the database query is generated in response to the intercepted web request, and wherein the second software hook retrieves the persisted portion of the intercepted web request;
      compare at least a portion of the persisted portion of the intercepted web request with at least a portion of the intercepted database query by tokenizing the intercepted database query and comparing portions of the intercepted database query corresponding to each token to each string captured in the intercepted web request; and
      determine, prior to the intercepted database query being executed, whether the intercepted database query corresponds to a potential SQL injection attack if a string of the intercepted web request matches a portion of the intercepted database query and such string comprises a character that modifies a syntax of the intercepted database query.

* * * * *